UNITED STATES PATENT OFFICE.

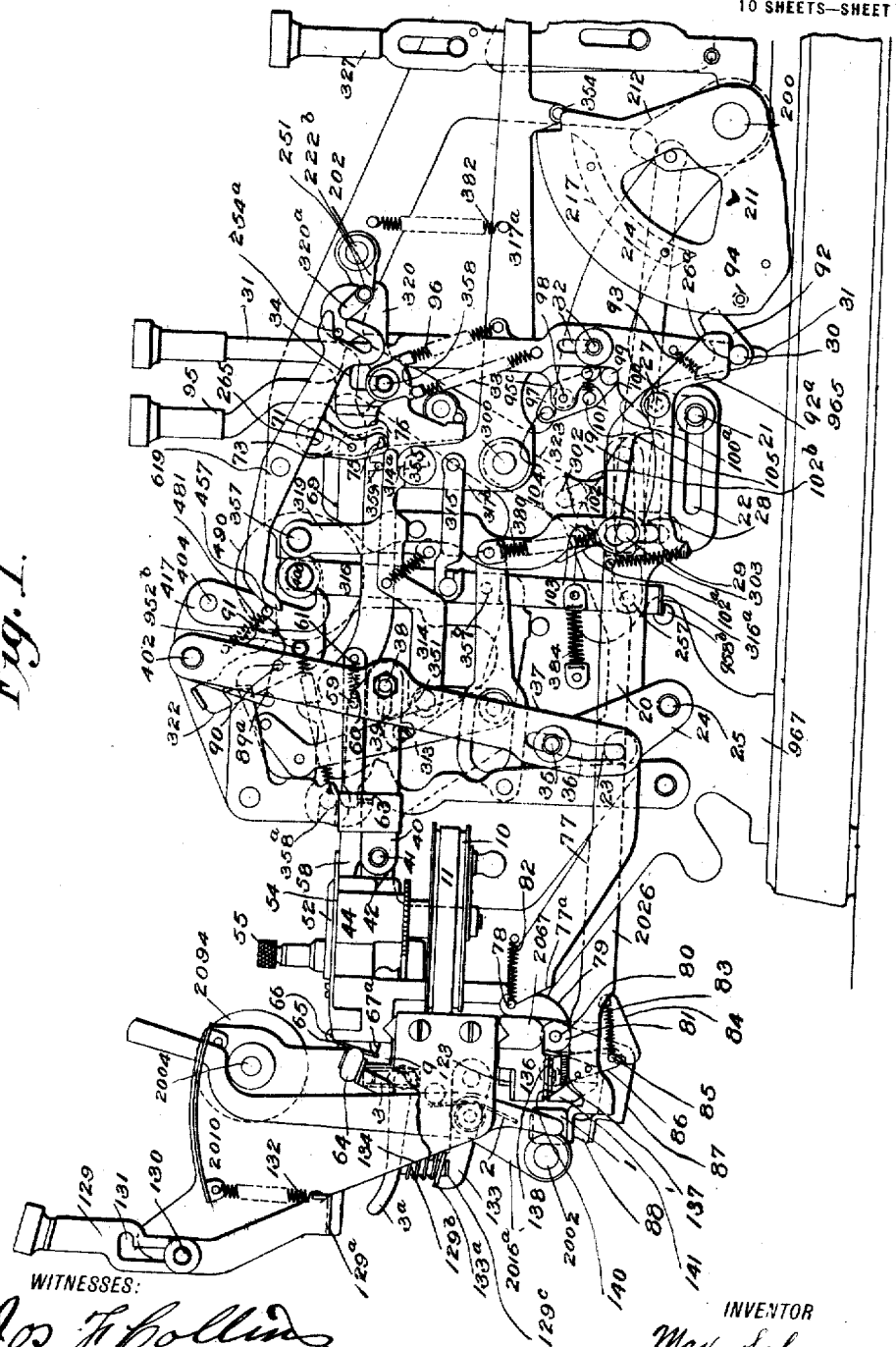

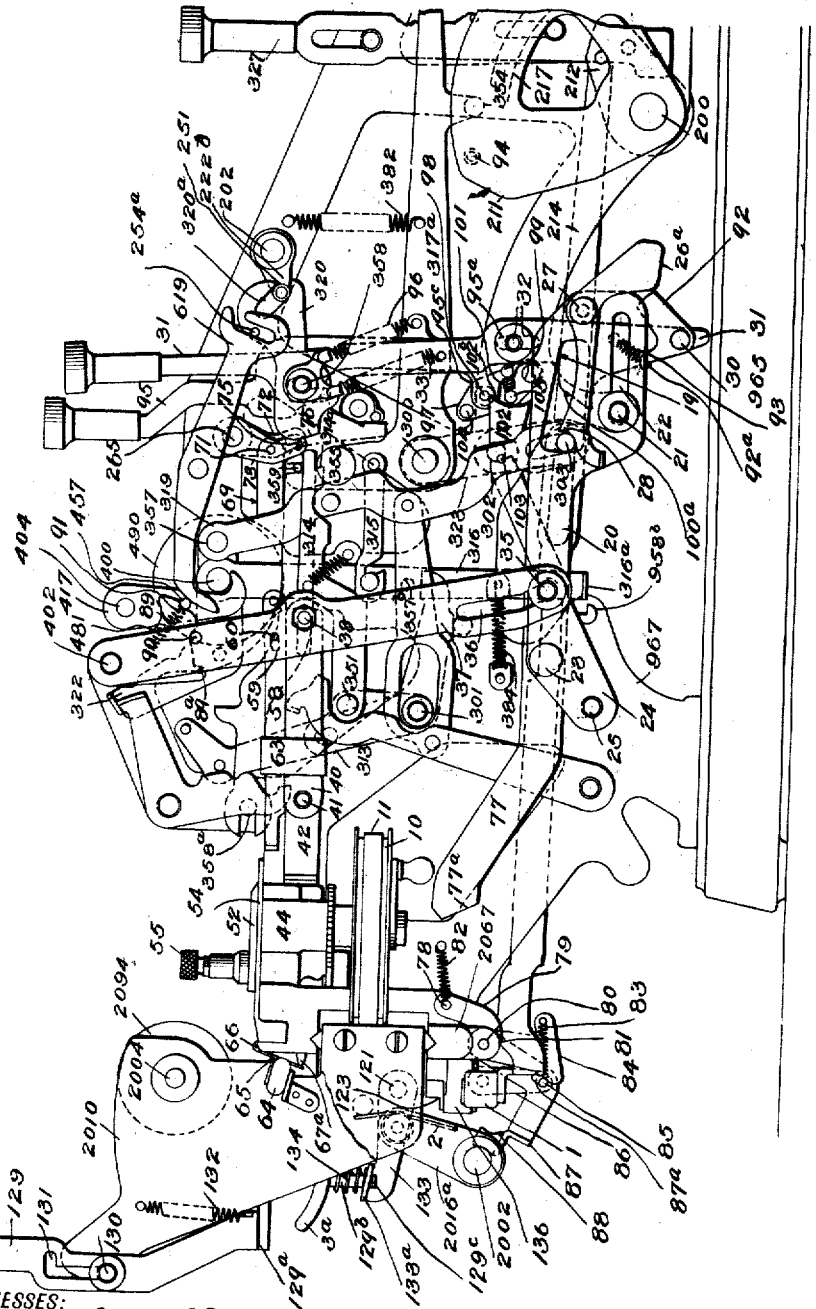

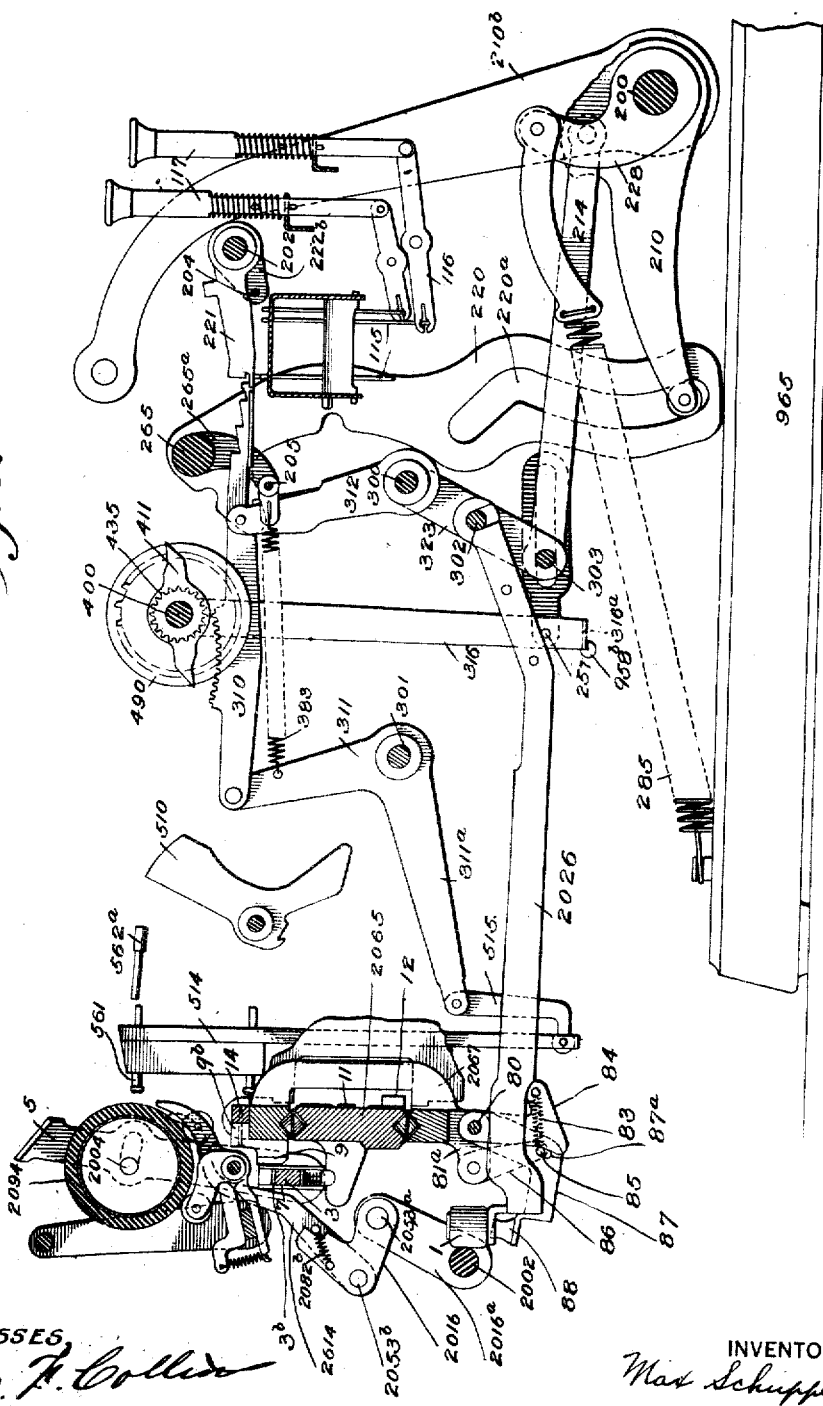

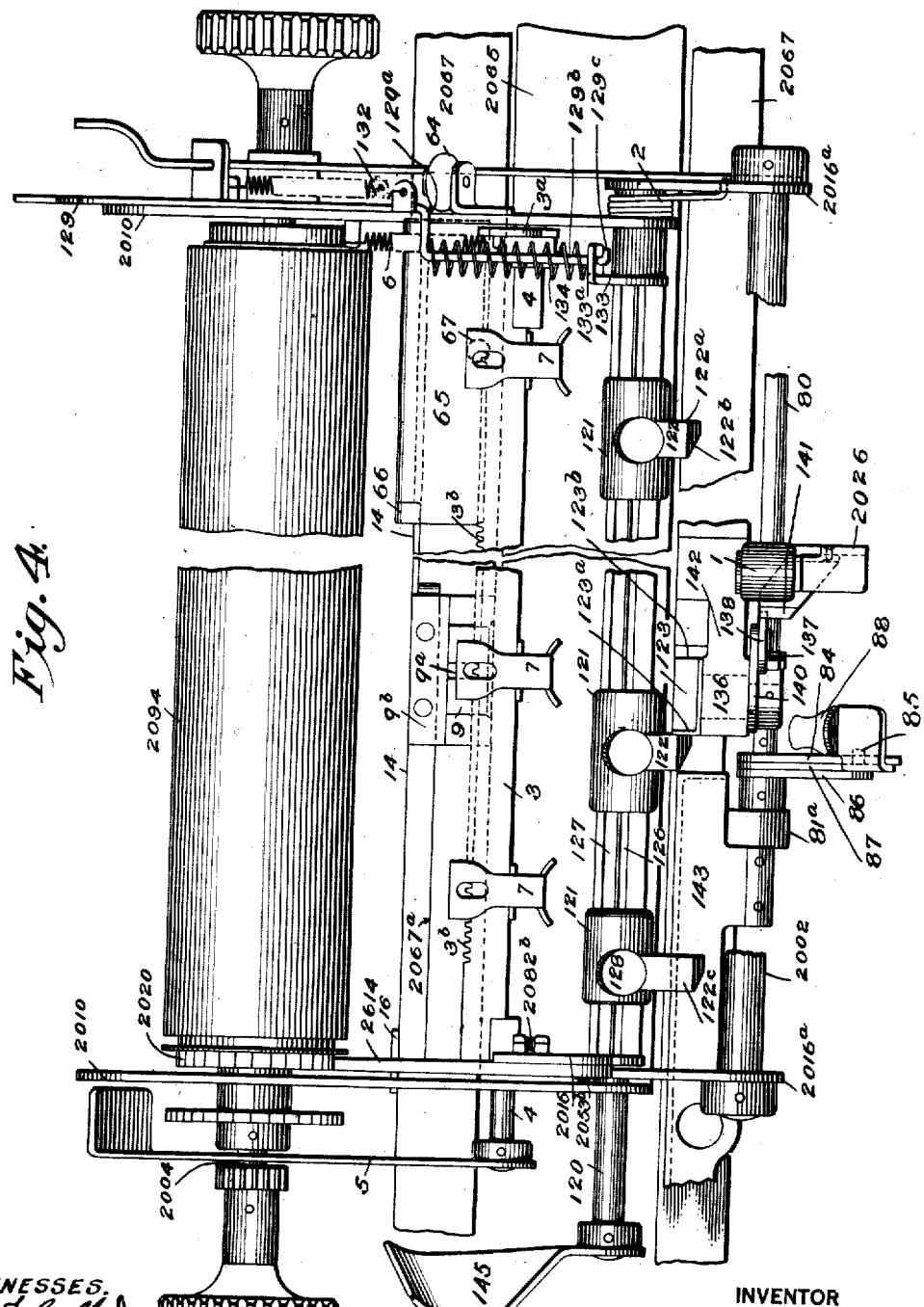

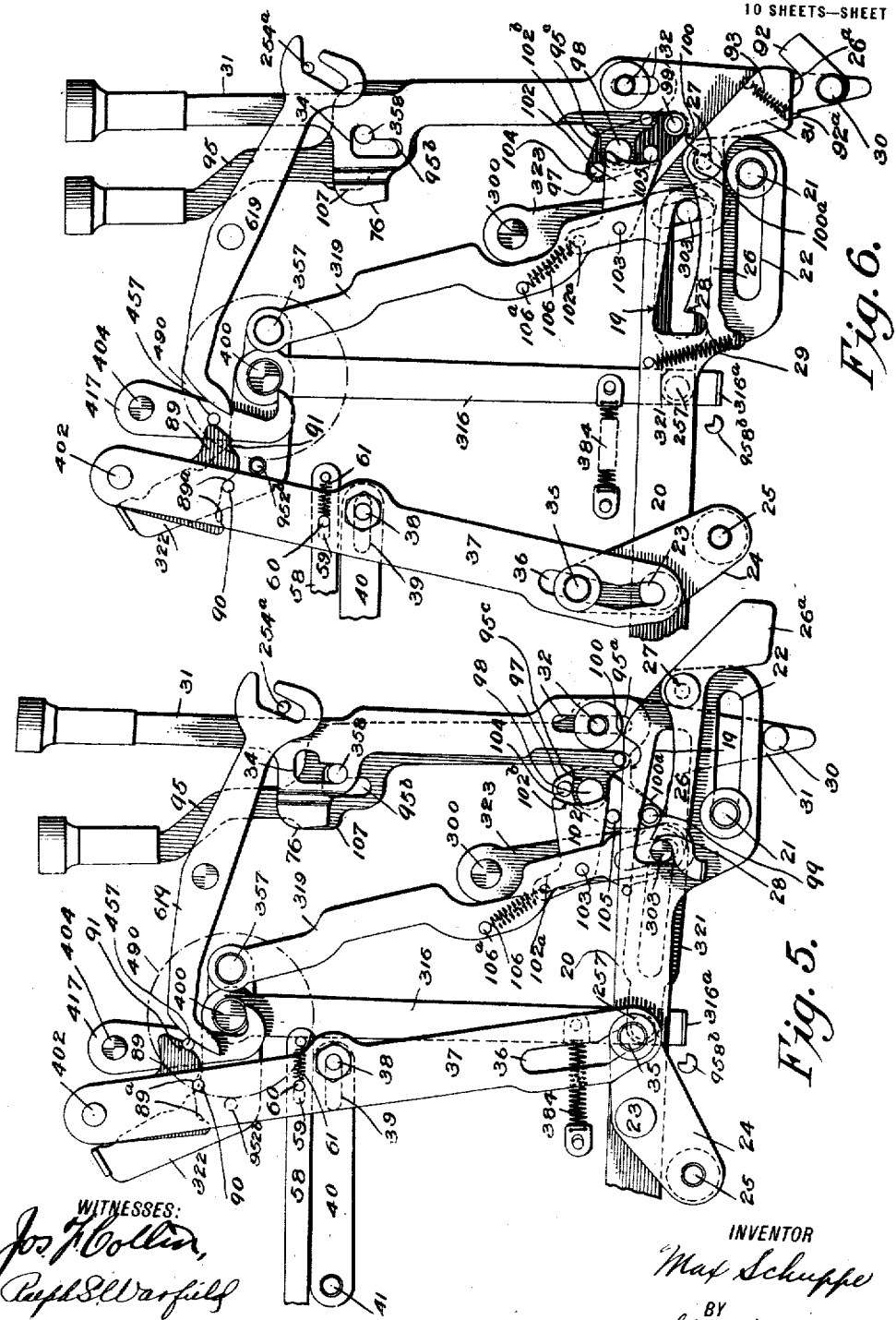

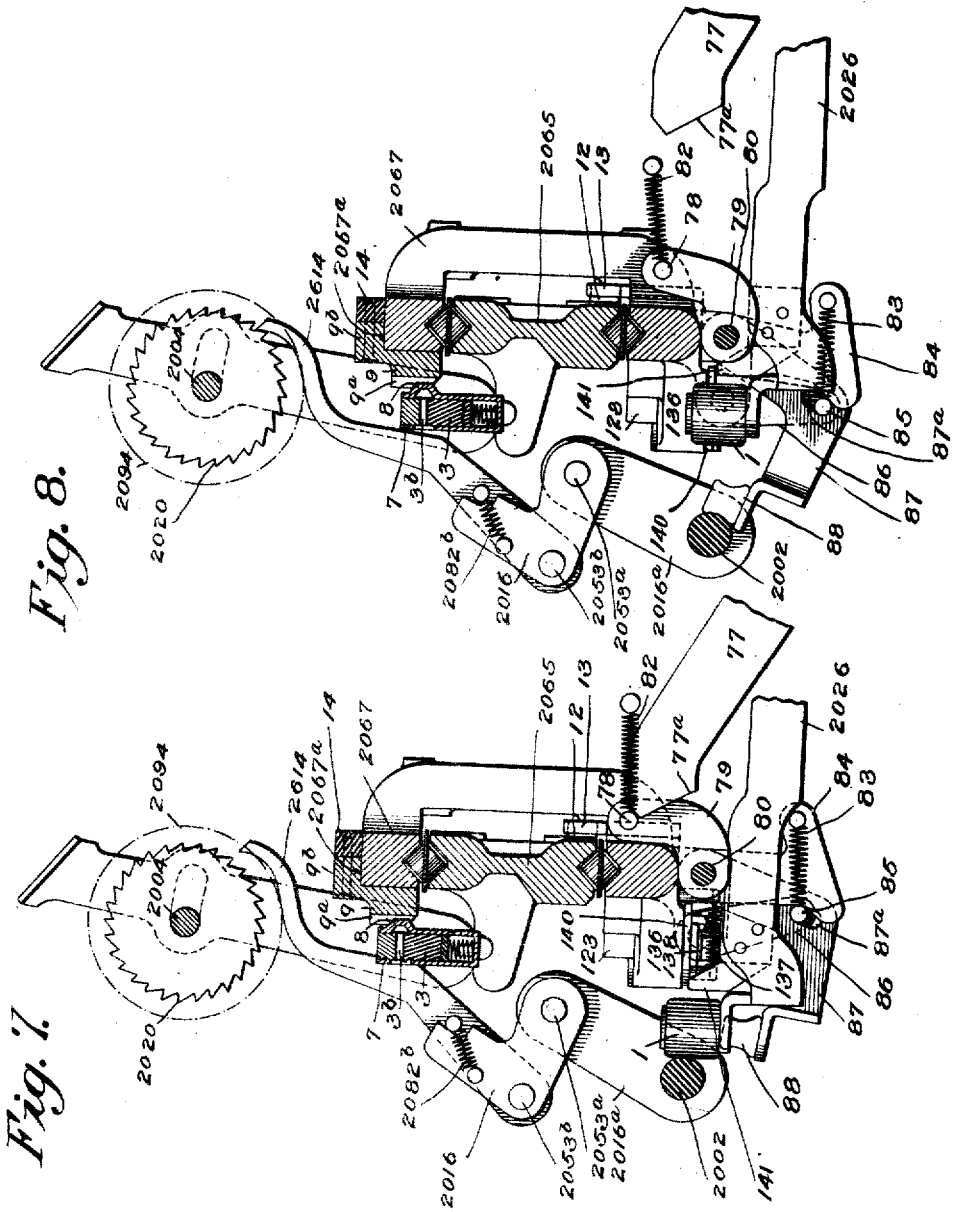

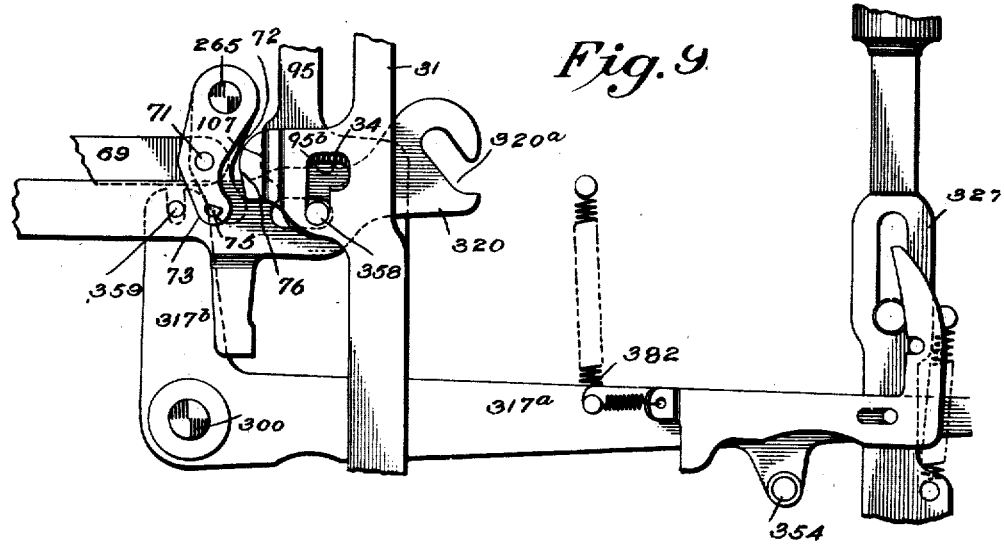
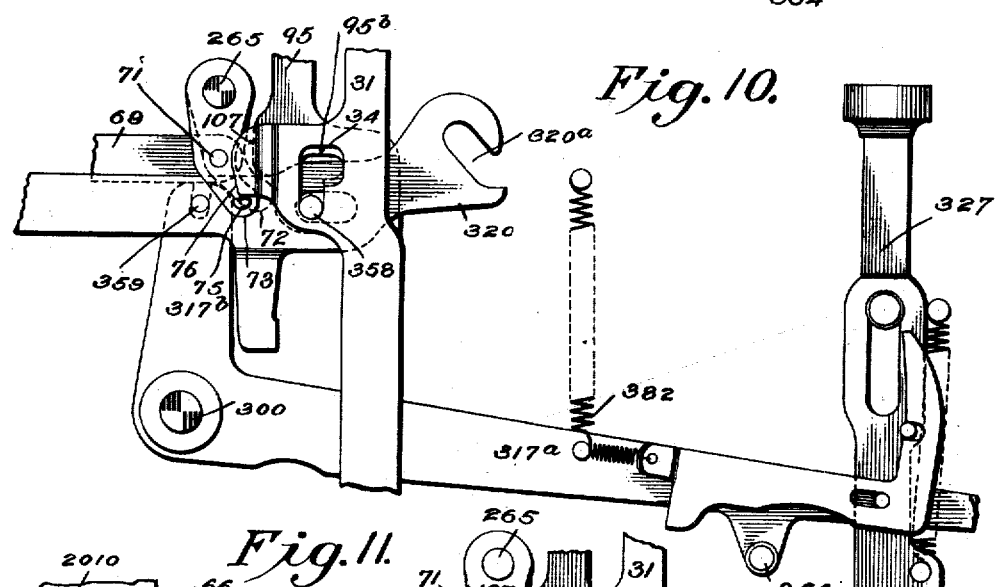
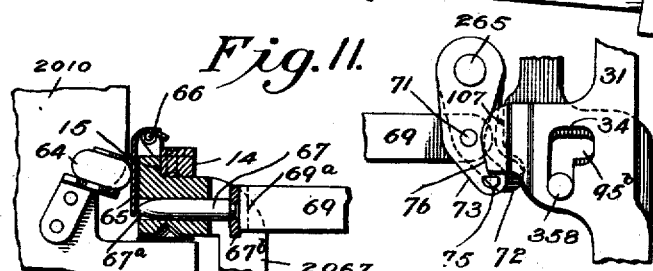
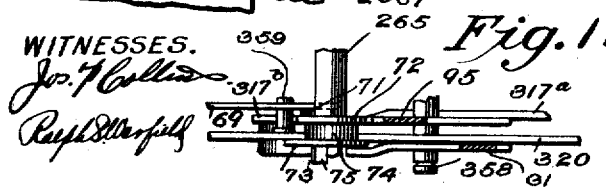

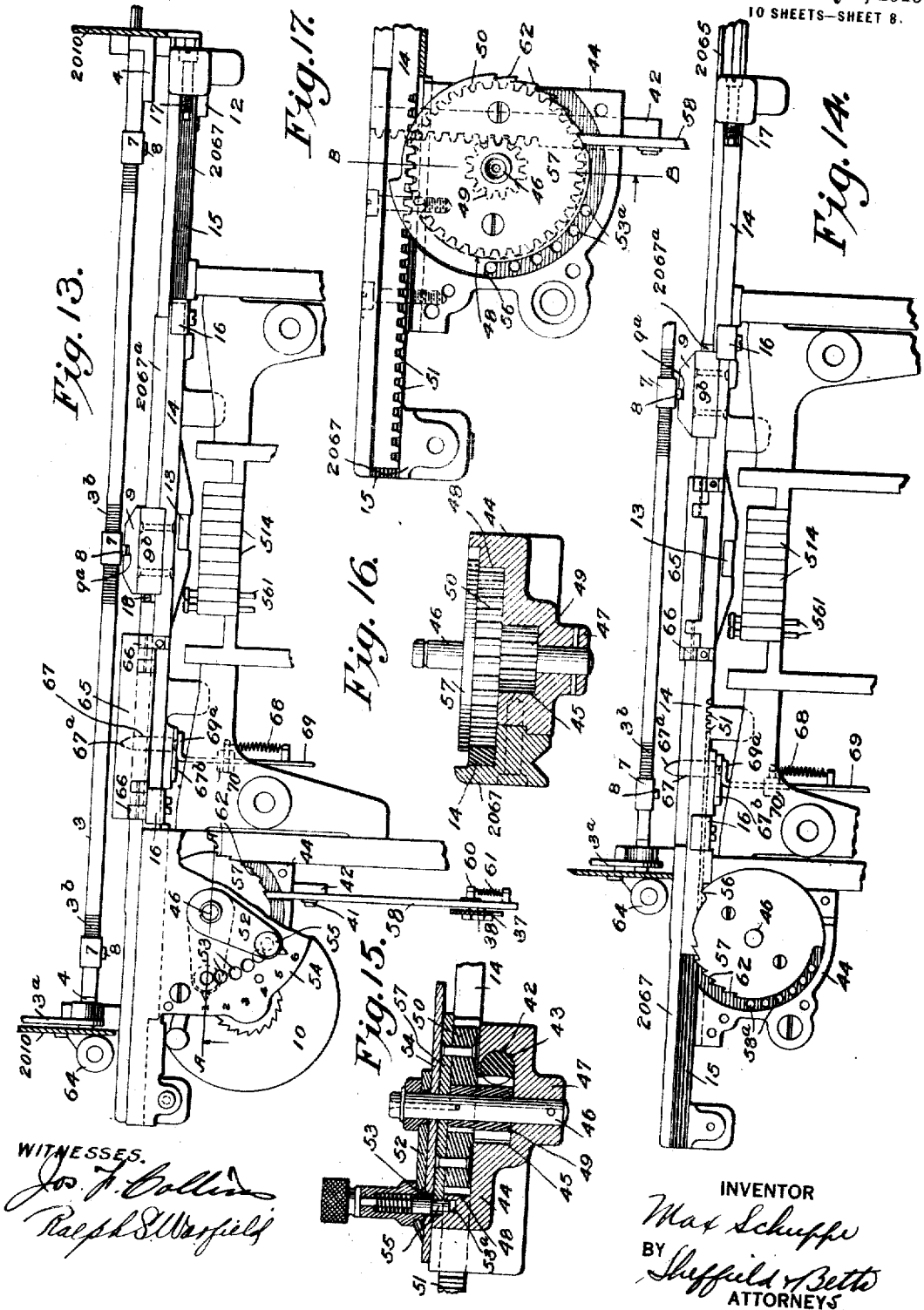

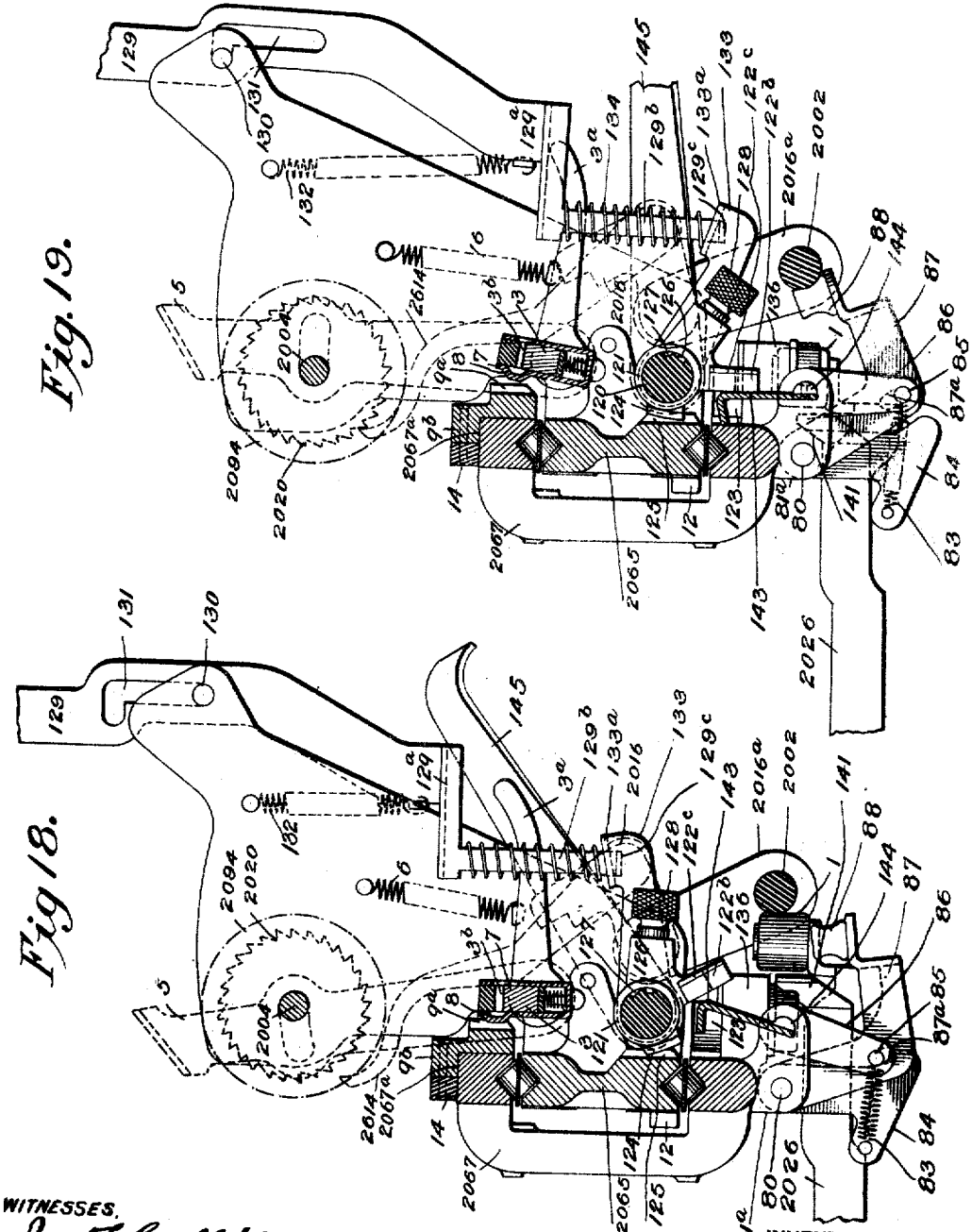

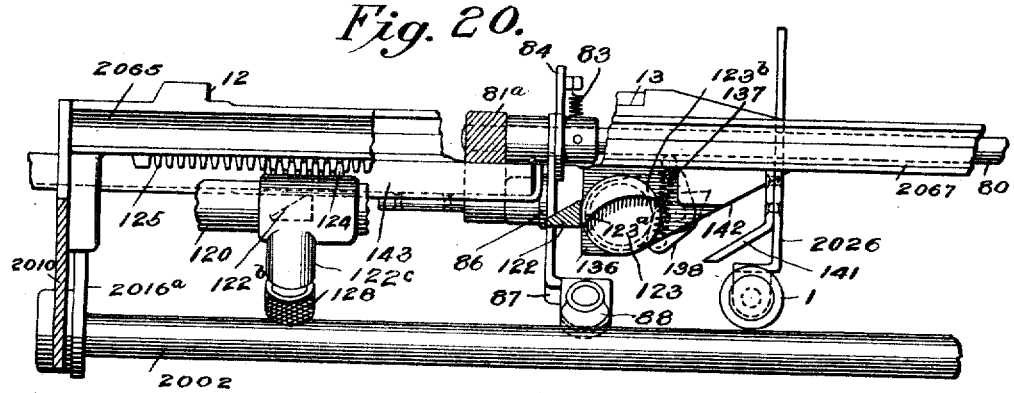
M. SCHUPPE.
CALCULATING MACHINE.
APPLICATION FILED APR. 27, 1918.
1,308,117.
Patented July 1, 1919.
10 SHEETS—SHEET 10.
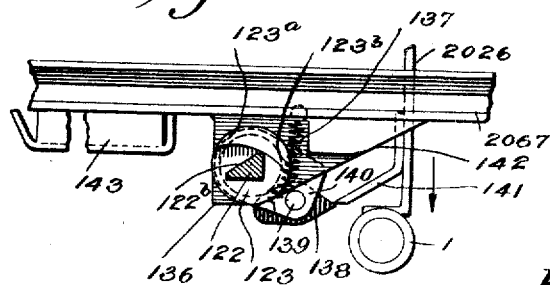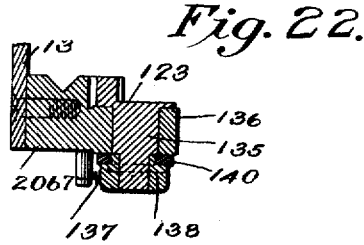
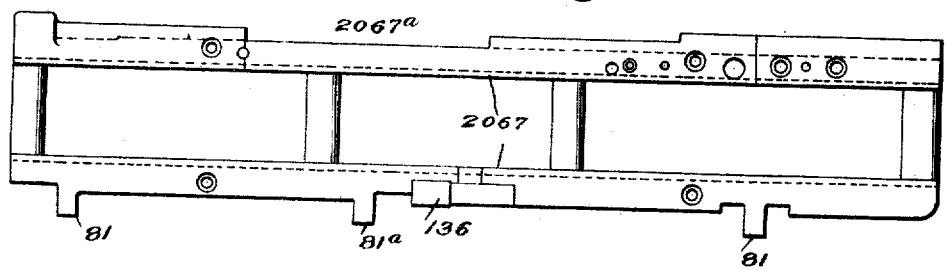
WITNESSES.
INVENTOR,
Max Schuppe
BY Sheffield & Betts
ATTORNEYS

MAX SCHUPPE, OF BROOKLYN, NEW YORK, ASSIGNOR TO WALES ADDING MACHINE COMPANY, OF WILKES-BARRE, PENNSYLVANIA, A CORPORATION OF PENNSYLVANIA.

CALCULATING-MACHINE.

1,308,117.　　　　Specification of Letters Patent.　　Patented July 1, 1919.

Application filed April 27, 1918. Serial No. 231,111.

*To all whom it may concern:*

Be it known that I, MAX SCHUPPE, a citizen of the United States of America, residing in the borough of Brooklyn, Kings county, city and State of New York, have invented new and useful Improvements in Calculating-Machines, of which the following is a specification.

My invention relates more particularly to traveling carriages for listing machines, although its use is not confined to this class of machines.

In listers used in the calculating machine art, for example, it is ofttimes desirable to print numbers and amounts alternately in their respective columns, in such manner that the several amounts to which the corresponding numbers respectively relate, are printed on the same lines with their designating numbers, as follows:

| Car No. | Lbs. |
|---|---|
| 1453 | 19,217.00 |
| 1786 | 42,560.00 |
| 2947 | 87,654.00 |
| 3298 | 72,945.00 | the designating numbers being printed but not added, and the amounts being both printed and added.

The same form may be used in listing check numbers, which are not to be accumulated, and the amounts or values of the respective checks, which latter will be accumulated.

In some classes of work, it is desirable to occasionally print a single non-added number in one column designating or relating to a series of accumulated amounts printed in another parallel column, as follows:

| Date or Clerk No. | Sales. | |
|---|---|---|
| 15 | 9.27 | |
|  | 4.13 | |
|  | .25 | |
|  | 1.84 | |
|  | 15.49 | (Total preferably printed in contrasting color.) |
| 27 | 12.90 | |
|  | 1.49 | |
|  | 2.17 | |
|  | .03 | |
|  | 16.59 | (Total preferably printed in contrasting color.) |

Where a designating number and its correlated amount are printed on the same horizontal line, the usual line space mechanism is disabled, preferably, during the operation which effects the imprint of the designating number. Obviously, also the carriage is shifted back and forth from one column to the other, depending upon whether designating numbers or amounts are to be printed, to locate the respective designating numbers and the corresponding amounts in their appropriate columns.

Heretofore, means have been provided to mechanically effect the above results, such means following one or another of a plurality of methods.

In one method, the carriage is connected by an adjustable tabulating stop, to a reciprocatory bar having a fixed range of travel in opposite directions.

Ordinarily, the shiftable bar remains stationary at either limit of its travel, and thus enables amounts to be printed in a vertical column at either limit in the usual manner.

Depressing a key throws in a clutch, and upon the operation of the machine, the shiftable bar is driven to the opposite limit of its travel, where it remains fixed until the machine is again operated. A second operation of the machine will drive the carriage back to the position from which it started, and succeeding operations continue to drive the carriage to one or the other limit of its travel alternately.

Means operated by the shiftable bar in its travel to the right, prevents the operation of the line space mechanism, and means operable either by the tabulating stop or by the bar, prevents the registration of the designating number on the counters.

When the non-add mechanism, as such latter means is termed, is controlled by the bar, its operation is synchronous with the disabling of the line space mechanism.

Such a machine is useful in alternately listing designating numbers and amounts, in accord with the first example given above, the operator setting up the designating number when the carriage is at its right-hand limit of travel, as in this machine, printing takes place prior to the carriage shift.

However, the machine is subject to the great disadvantage that the length of travel of the shiftable bar is absolutely constant and inflexible, and consequently the machine can only be used with special forms having columns arranged a distance apart equal to the throw of the carriage when shuttling back and forth.

Also, because the carriage and its bar have two stationary positions, the operator, when desiring to list and add a single column of figures, may throw out the clutch when the carriage is in its right hand position, at which time the line spacing and non-add mechanisms are disabled. In such event, should the operator proceed with his work, the series of numbers which he desires to add and separately list, will be printed in one spot over one another, and will not be added on the counters.

A still further disadvantage inherent in this type of machine is, that in order to print occasional designating numbers only, in accordance with the second example given, it is required that the operator charge his mind with the necessity of releasing the key controlling the clutch between the drive shaft and shiftable bar, after listing the designating number and before starting the stroke to list and add the first amount.

Another method hitherto employed, is to provide a spring adapted to return the carriage and shiftable bar to, and yieldingly hold them at one of their two limits of travel, preferably the leftward, at each operation of the machine; an oscillatory camming member actuated from the main drive shaft, being adapted to wipe along a tappet secured to or connected with the carriage or shiftable bar, to shift the bar and its carriage to the opposite limit of travel against the tension of the spring.

A key-controlled adjustable connection between the camming member and drive shaft governs the actuation of the cam.

Normally, the carriage remains in its leftward position, to enable amounts to be listed under one another in vertical alinement and to accumulate such amounts on the counters, in the usual manner.

Actuation of the key-controlled connection to effective position, followed by an operation of the main drive shaft, causes the cam to positively force the shiftable bar and carriage to the right. The cam terminates in a dwell intended to hold the carriage stationary at the end of its right-hand travel prior to the printing operation, and after the printing takes place, the cam returns to its normal position and frees the carriage to the action of its feed spring, which causes the carriage to follow the cam until arrested by the latter, or by an adjustable stop in the path of return of the carriage or its shiftable bar.

In this form of machine, the key controlling the connection between the main drive shaft and the cam, is automatically released on the return stroke of the cam, which feature enables the machine to readily perform the second example given, but requires that the operator remember to actuate the key on every alternate stroke, when working examples like the first above given.

In addition to thus burdening the memory of the operator, one of the main objections to this form of mechanism, is that on rapid operations, the cam is so forcibly pressed against the tappet traveling with the carriage, as to drive the carriage at such rate that the carriage overthrows, or travels past the position in which it should stand when printing in the leftward column. In other words, the momentum of the carriage causes it to proceed farther to the right after the dwell portion of the cam contacts the tappet, and as printing occurs immediately after the dwell portion of the cam has reached its position to contact the tappet, it is plain that, under the above conditions, amounts in the left-hand column would be printed in scattering positions, and would also be blurred, due to the travel of the carriage at the moment of printing.

Comparing the former methods above explained, it will be seen that the first one provides means to positively drive the carriage to predetermined points, first in one direction, and then in the opposite direction, on alternate operations of the machine; and that the second method employs means to drive the carriage positively in one direction from its home position and then permits its return to home position under the influence of the feed spring, during a single operation of the machine. Thus, the carriage normally remains in its home position.

Business practice also requires the cross-tabulation of amounts, or of numbers and amounts, that is, the printing of such numbers and amounts horizontally across the page in three or more columns, and calculating machines, with automatic tabulating mechanism so arranged that the carriage will shift to bring a new column to the printing point at each operation of the machine, without line spacing, have heretofore been devised.

However, the types of shuttle carriage machines above set forth, are not so equipped, and could not be equipped for automatic cross-tabulating, without the exercise of inventive ingenuity.

One of the objects of this invention is to provide a shuttle carriage which will combine the results obtained in the first two former methods above explained, in a simple and novel manner, whereby to enable the operator by the single setting of a manually-controlled means, to automatically effect the alternate imprint of amounts in parallel columns, and to permit the operator to adjust the location of one of the columns closer to or farther from the other.

And I attain this object by a new combination of mechanisms, employing in part the principles of both former methods, in such manner that an improved and more efficient, accurate and dependable machine is produced, which does not impose a burden on the memory of the operator.

To these ends, I provide a carriage normally held stationary in its home position by a feed spring and positively driven in the opposite direction to a predetermined point where it is arrested against overthrow until after the printing occurs, whereupon, the carriage is returned to its home position by the feed spring, controlled by the positive drive mechanism.

A further object is to provide a carriage adapted on every alternate operation of the machine, to be positively shifted on the forward stroke of the main drive shaft, from its home position to its opposite limit of travel, and to return to its home position under yielding action, during the return stroke of the main drive shaft, without attention on the part of the operator except for the preliminary setting of a manually-controlled device.

This object differs from that attained in the old method last explained, in that in such old method, the operator is required to operate the key lever on alternate operations when the designating number is to be printed in the left-hand column.

Also, such object differs from that attained in the old method first explained, since the carriage is positively driven to one limit of its travel on the forward stroke of the main drive shaft prior to the printing action, and the restoration of the carriage to its home position occurs during the return stroke of the main drive shaft, and is effected by the yielding action of the feed spring.

A still further object is the provision of novel and improved means to shift the carriage to print occasional numbers in a column to the left of that in which amounts are listed when the carriage is in its home position, such novel means being operable by the means which effects the automatic shuttling of the carriage on alternate operations of the machine.

This object differs from the second method heretofore explained, in that such method is not adapted to be controlled by means to effect the automatic repeated shuttling action of the carriage. The means whereby the single shuttle operation is effected, also disables the line space feed, so that the designating number, and its corresponding amount, are printed on the same horizontal line.

Still another object is the provision, in a single carriage mechanism equipped for the alternate and occasional shuttling operations above set forth, of an automatic cross-tabulating mechanism, whereby, upon simply operating a manually-controlled key or similar device, the automatic cross-tabulating action is substituted for the shuttling action, and vice versa.

In brief, in a machine constructed in accordance with this invention, the operator can place the carriage mechanism in condition to shuttle once, to automatically shuttle on alternate operations, or to automatically cross-tabulate, by simply depressing the appropriate key.

A still further object is to enable a series of successive items to be cross-tabulated, the respective items being successively and automatically non-added and added on the counters, and printed in their respective columns.

A further object, and one related to the foregoing is the provision of a single means to control the shuttling and cross-tabulating operations of the carriage, whereby the shuttling mechanism may be disabled and the cross-tabulating mechanism rendered effective, or vice versa.

Another object is the provision, in combination with the shuttling mechanism, of novel means to effect an adjustment of the carriage travel, whereby amounts printed in one column, may be arranged relatively closer to or farther from the parallel column in which the designating numbers are printed.

The carriage is thus adapted for use with a variety of forms, which may require that the units places in the columns, be located varying distances apart. My invention also enables the operator to vary the interval between the units digits of the respective columns of numbers and amounts, so as to skip an intermediate column, for instance, and to accurately locate the units digits in the units place in one column of the sheet, the printing point of the units digits of the remaining column being fixed by the limit of travel of the carriage on its positively driven shuttle stroke. Thus, in adjusting the carriage to any particular form, the latter may be inserted in the machine, one of the shuttle mechanism control keys depressed, and the main drive shaft operated on its forward stroke to shift the carriage and form from its normal position toward the opposite limit of its travel, where it is held until the form is adjusted relatively to the printing point, to bring the units place of the column on the form appropriated to the designating numbers, into registry with the units type, after which the main drive shaft is permitted to return, to enable the carriage to be drawn to the left, until the units place of the column appropriated to the accumulated amounts registers with the units printing type, whereupon, the stop mechanism is adjusted to arrest the return travel of the carriage at that point.

In this manner, columns of numbers and amounts may be adjustably located relatively to each other, and in the form of my invention herein shown, I can vary the location of the right-hand columns of accumulating amounts relatively to the left-hand column of designating numbers, as follows:

| Numbers. | Amounts. | |
|---|---|---|
| 922.86 | 432.29 | (a) |
| 587.98 | 127.65 | (b) |
| 432.75 | 379.52 | (c) |
| 345.62 | 586.30 | (d) |
| 876.23 | 791.84 | (e) |
| 742.99 | 621.76 | (f) |

It will be noted that the location of the amount column can be adjusted to print successive amounts in vertical alinement, but at varying distances from the column of numbers, and in accordance with either of the adjustments a, to f, it being understood that the units digits of the successive amounts under any of the adjustments, will all lie in vertical alinement, but at such a distance from the column of figures as is illustrated in the particular adjustment selected.

Obviously, adjustment a, for instance, will permit the carriage to shuttle across and skip a narrow column.

Another object of my invention is to prevent rebound of the carriage on its return to its home position, to which end, I provide positive means to lock the carriage on its return, and arrange to disable the locking means just previously to the beginning of the positively actuated shuttling throw of the carriage. The lock again becomes effective just prior to the return of the carriage.

A still further object, and one which, so far as I am aware, is entirely new, is to prevent the shuttling operation of the carriage when the extent of travel of the carriage in such operation, would exceed the ordinary bounds between which the carriage may travel.

The maximum travel of the carriage is customarily fixed by limit stops, the location of which is determined by the length of the platen, so that amounts may be printed as near each end of the paper on the platen as is practicable.

My present invention is designed to prevent a shuttle operation of the carriage when the home position of the carriage is located so close to the limit stop toward which the carriage travels in shuttling, that the throw imparted to the carriage on such shuttle travel, would tend to drive the carriage beyond the limit set by the final stops.

Obviously, in the absence of such disabling means, the carriage could not pass the fixed stop toward which it travels, and the machine would be rendered inoperative, even if parts were not broken, upon any attempt to force the carriage past such stop.

Still another object of the invention is the provision of simple and improved means to automatically prevent the registration of numbers on the accumulating section of a calculating machine, when the carriage is in one of its columnar positions.

A still further object is the provision of novel means to enable the digits constituting a designating number to be printed on the same line with the digits forming the amount to which such designating number relates, by disabling the line space feed until the second group of digits is printed, whether an amount or a designating number.

To these and other ends, my invention includes certain novel features and combinations of parts, and other objects and advantages, all of which will be more fully explained hereinafter and particularly pointed out in the claims.

In the accompanying drawings, Figure 1 is a left hand side elevation of the familiar Wales calculating machine, parts being omitted, equipped with one form of my invention, the machine being at rest;

Fig. 2 is a similar view, showing the position of the parts, after the depression of the set keys controlling the carriage-shuttling mechanism, the main drive shaft being at the end of its forward stroke;

Fig. 3 is a longitudinal sectional view through the machine;

Fig. 4 is a rear view of the carriage;

Fig. 5 is an enlarged detail side view of a part of the train of mechanism by which the carriage is shuttled, together with the controlling and setting keys, and the non-add controlling cam, showing the means whereby the control key governs the setting key, the control key being depressed, and the setting key released, at the end of the forward stroke of the main drive shaft;

Fig. 6 is a similar view, showing the positions of the parts at the end of the next succeeding forward stroke, at which time, the setting key has been automatically depressed;

Fig. 7 is a detail sectional view through the carriage, showing the shuttle mechanism control of the line space disabling mechanism in normal position;

Fig. 8 is a similar view, showing the line space disabling mechanism effective;

Fig. 9 is a detail side view, showing the trip means operated by the special key to release the control and setting keys, the parts being in normal position;

Fig. 10 is a similar view, showing the positions assumed by the parts upon the depression of the special key;

Fig. 11 is a fragmentary detail, partly in section, showing the carriage control of the trip means;

Fig. 12 is a fragmentary top plan view of the trip means and its operating connections;

Fig. 13 is a top plan view, parts being removed, of the carriage and the means for adjusting the shuttling travel thereof, the traveling abutment being in its home position;

Fig. 14 is a similar view, showing the traveling abutment at the opposite end of its shuttle stroke;

Fig. 15 is a detail sectional view of the means for regulating the shuttle travel of the carriage, taken on line A—A of Fig. 13;

Fig. 16 is a detail sectional view of the casing for the regulating means, taken at right angles to Fig. 15 and on line B—B of Fig. 17;

Fig. 17 is a top plan view of the regulating means, parts being omitted;

Fig. 18 is a sectional view through the carriage, taken from the side opposite that in which Figs. 7 and 8 were taken, and showing the column tabulating mechanism in idle position, with the column tabulating control of the line space disabling mechanism;

Fig. 19 is a similar view, showing the tabulating key depressed to render the column tabulating and line space disabling mechanisms effective;

Fig. 20 is a detail top plan view, partly broken away and in section, showing the column tabulating escapement mechanism in normal position;

Fig. 21 is a detail top plan view of the escapement member, showing the checking stop thereof effective on the return stroke of the main drive shaft;

Fig. 22 is a detail sectional view of the escapement member;

Fig. 23 is a side elevation of the carriage frame alone, and

Fig. 24 is a top plan view thereof, showing the grooved top rail.

I have chosen to illustrate one form of my invention applied to the well-known Wales calculating machine, such as is disclosed in U. S. patents to Wales, 794,205, July 11, 1905, 797,032, August 15, 1905, and 940,758, Nov. 23, 1909; McFarland, 842,232, January 29, 1907; McFarland & Wales, 880,157, February 25, 1908; McFarland, 880,159, February 25, 1908, and 1,024,013, April 23, 1912, and Pentecost, 1,223,419, April 24, 1917, to which reference is made for a more extended explanation of the various mechanisms employed, their functional performance, and the results obtained.

Referring to Figs. 1, 2 and 3, a base 965 supports right and left side frames 967, between which are mounted from front to rear, a keyboard mechanism, an accumulating mechanism, and a printing mechanism. The printer includes typecarriers 511 (Fig. 3) supporting types 561, adapted to impinge against a platen 2094 fast on an axle 2004 journaled in right and left end plates 2010 (Figs. 1 and 2) secured to a carriage slide 2065 (Fig. 3) mounted to travel back and forth between the upper and lower rails 2067 of a carriage casting extending across and secured to the rear ends of the side frames 967.

The keyboard mechanism (Fig. 3) includes denominational rows of keys 117 to control correspondingly arranged stops 115 adapted to arrest the advance of a similarly arranged series of adding racks or drive members 310, of which latter there is one for each counter 490.

Depression of a key 117 in any of the denominational rows, rocks a lever 116 to project the proper indexing stop 115 into the path of the corresponding rack or drive member 310.

The parallel racks or drive members 310 are supported for movement forwardly and rearwardly, by front arms 312 journaled on a cross shaft 300, and by rear arms 311 journaled on a cross rod 301. Springs 383 connected to the rear arms 311 and to a restraining and restoring bar 205, tend to advance the racks 310 against the stops 115 set up in their respective paths. The restraining and restoring bar 205, by its contact with the front arms 312, normally restrains the racks 310 against advancing and retains them in retired position.

Fingers 265ᵃ depending from a shaft 265 journaled in the side frames 967 for rotation, support the restraining and restoring bar 205. The free end of an arm 210 fixed to the main drive shaft 200, traverses a cam slot 220ᵃ formed in a crank 220 secured to the shaft 265, to rock the latter. Normally, the main restoring spring 285 connected to an arm 228 on the main drive shaft, retains the crank-operating arm 210 at one end of the slot 220ᵃ, to hold the restraining and restoring bar 205 in its normal position.

The counters 490, each provided with a pinion 435, are individually rotatable on an axle 400 located above the racks 310 and supported at its opposite ends in arms 322 (Figs. 1 and 2) pivoted at 952ᵇ to the respective side frames 967. Props 319, the upper ends of which are pivoted at 357 to the axle-carrying arms 322, are slotted at their lower ends to accommodate the opposite ends of a trip rod 303 (Figs. 1, 2 and 3) suspended by swinging radius bars 323 journaled on the cross shaft 300, to shift forwardly and rearwardly in an arcuate path. Links 214 connect the trip rod 303 to arms 212, 210 on the main drive shaft 200. The props 319 and trip rod 303 normally sustain the counters 490 and their pinions 435 out of mesh with the racks or drive members 310, as shown in Figs. 1 and 3.

Converging levers 311ᵃ (Fig. 3) connected to and extending rearwardly from the respective rack-supporting arms 311, carry depending links 515 at their rear ends, which links are, in turn, pivoted to the tails of, and support the typecarriers 514 in which the types 561 are mounted. The restraining and restoring bar 205, when in normal position, holds the typecarriers lowered so that their "O" types lie just below the printing line of the platen 2094.

Drawing forwardly a handle 210$^b$, for instance, in an adding operation, turns the main drive shaft 200 on its forward stroke, against the tension of the main spring 285. The main drive shaft causes the arm 210 to traverse the cam-slotted crank 220 and withdraw the restraining and restoring bar 205 relatively to the forward rack-supporting arms 312. The springs 383 advance the racks 310 as the restraining and restoring bar retreats, until the rack extensions contact either the stops 115 projected into their paths, or the usual rack detents 221 journaled on a cross shaft 202 and normally lying in the paths of the racks. The rack detents overlie the key-set stops 115, to be displaced by the stops when the latter are projected.

The racks 310, as they advance, rock the rear arms 311 and the converging levers 311$^a$ to lift the typecarriers 514 and bring the types 561 successively to the printing line, the stops 115 arresting the racks and typecarriers when the latter have positioned the types corresponding to the depressed keys 117, at the printing line. At this time, the racks have advanced sufficiently so that on their retirement, they will turn the counters 490 to register thereon the amount represented by the depressed keys.

Returning to the beginning of the operation of the machine, the main drive shaft 200, as it starts on its forward stroke, also draws the links 214 forwardly, to advance the trip rod 303 in a descending arc. The counter-supporting props 319 are thus relieved of support and would follow the trip rod, to lower the counters 490 into engagement with the racks 310 through the pinions 435, at about the time the racks start on their forward stroke, were it not for the legs or counter-detaining members 316 (Figs. 1, 2 and 3) journaled at their upper ends on the ends of the counter axle 400, and provided with feet 316$^a$ normally held by springs 384, in alinement with steps 958$^b$ projecting from the side frames 967. Just as the counters 490 start to descend, the feet 316$^a$ strike and rest on the steps 958$^b$ to detain the counters out of mesh with their racks until the latter have completed their advance.

To afford plenty of time for the racks to complete their advance, the counters are withheld from engagement with the racks, in adding operations, until the end of the forward stroke of the main drive shaft.

This is effected by providing the legs 316 with slotted bridle links 321, (Figs. 1, 2 and 3) pivoted at 257, thereto, the ends of the trip rod 303 adapted to idly traverse the slots in the bridle links and in the lower ends of the counter-supporting props 319 until, near the end of the forward stroke, the trip rod strikes the front end walls of the slots in the bridle links 321 and trips the feet 316$^a$ from the seats 958$^b$, whereupon the counters 490 snap into engagement with their racks 310, due to gravity, and the springs 380 (Figs. 1 and 2) connected to the props 319 and tensioned by the trip rod on its advance.

The printing hammers 510 (Fig. 3) are tripped by mechanism not shown, but fully set forth in U. S. Patents Nos. 794,205 and 940,758, referred to, to strike the firing pins or plungers 562$^a$, which, in turn, drive the positioned types 561 against the platen 2094 to effect the imprint of the amount set up on the keyboard, just after the counters engage their racks.

The operator releases the handle 210$^b$ at the end of the forward stroke, and the main restoring spring 285 effects the return of the main drive shaft, which then causes the arm 210 to retrace the slot 220$^a$ in the crank arm 220 to shift the restraining and restoring bar 205 back to normal position. The bar 205 presses against the front arms 312 of the advanced racks 310 and retires the latter to turn the counters 490 and register thereon the amount represented by the depressed keys.

Retirement of the racks also lowers the typecarriers to normal position.

The trip rod 303, which operates as a counter-disengaging and supporting rod, is returned by the links 214, and retraces its path in an ascending arc. At first, the trip rod idly traverses the slots in the counter-supporting props 319 and bridle links 321, to permit the counters to remain engaged with the racks during the retirement of the latter. Near the end of the return stroke, however, and after the retirement of the racks, the trip rod strikes the upper ends of the slots in the counter-supporting props 319 and lifts the latter to rock the arms 322 and disengage the counters 490 from the racks 310. The arms 322 and counter axle 400, as they ascend, lift the legs 316 until the feet 316$^a$ thereof clear the rests 958$^b$, whereupon the springs 384 snap the feet into alinement with the rests.

The mechanism for effecting the imprint of the types 561 is also reset on the return stroke, and the machine is ready for another operation.

Suitable ribbon feed and reversing mechanism is provided to cause a step by step travel of the ribbon past the types in either direction.

Mechanism is provided to effect the imprint of totals and sub totals, and the clearing of the counters.

Thus, depression of a key 327 (Figs. 1 and 2) rocks a set lever 317ª fast on the cross shaft 300, to turn the latter, and with it a somewhat similar set lever (not shown) on the opposite side of the machine.

The set levers are each provided with upwardly projecting arms 317ᵇ connected by links 315 with the legs 316, whereby depression of the key 327 swings the legs out of alinement with their rests 958ᵇ.

The upper end of one of the arms 317ᵇ also contacts a stud 359 on a slide 320 shiftable forwardly and rearwardly on pins 358 and 358ª projecting from one of the side frames 967, to advance the slide. A cam slot 320ª in the slide embraces a roll 251 on an arm 222ᵇ fast on the cross shaft 202 journaled in the side frames. Similar arms 222ᵇ (Fig. 3) fastened to the cross shaft just within the side frames 967, carry a bail 204 extending beneath the rack detents 221.

The slide 220, on its advance, causes the roll 251 to follow the cam slot 220ª and rock the shaft 202, which swings the bail 204 against the entire series of rack detents, to shift the latter out of the paths of their respective racks 310.

Furthermore, when the set levers 317ª are rocked by the depression of key 327, a thrust stud 355 (Figs. 1 and 2) on each of the arms 317ᵇ of the set levers, advances past shoulders 314ª on corresponding thrust links 314, pivoted at their rear ends at 351, to the upper arms of counter-lifting bell crank levers 313. The remaining arms of the levers 313 extend forwardly behind the legs 316 and beneath studs 357ᵇ projecting inwardly therefrom.

The set levers are held in adjusted position by a stud 354 on one of the set levers 317ª, which is shifted from normal position above, to a position below the path of a curved locking rib 217 on a segmental plate 211 fast on the drive shaft 200. When the main drive shaft is turned on its forward stroke, while the key 327 is depressed, the forward end of the rib 217 passes over the stud 354 and locks the set levers 317ª where adjusted until the rear end of the rib releases the stud and set levers to the action of the restoring spring 382.

In the foregoing adjustment, the trip rod 303, as it descends on the forward stroke of the main drive shaft, lowers the counters 490 into mesh with their racks 310 prior to the advance of the latter. Hence, the racks, as they advance, upon the withdrawal of the restraining and restoring bar 205, rotate the counters in a direction reverse to that in which they turn when adding, until cam stops 111 (Fig. 3) fast with the counters, strike a total alinement bar (not shown herein, but fully set forth in patent to Wilgus, 1,133,596, March 30, 1915,) which arrests the counters in their zero positions.

The locking rib 217 releases the stud 354 at the end of the forward stroke of the main drive shaft to enable the latter, and the set levers 317ª to return to normal position under the influence of the spring 382 assisted by the inclined rear end of the rib, which, as the main drive shaft starts on its return stroke, impinges against the stud 354 to cam the set levers back toward their normal positions. The arms 317ᵇ of the set levers, during such forcible return, press the studs 355 against the shoulders 314ª of the thrust links 314 to rock the counter-lifting bell cranks 313 and cause them to raise the legs 316 to disengage the counters 490 from the racks 310 prior to the retirement of the latter.

If a sub-total is to be printed, the key 327 is held depressed until after the return stroke has begun, so that the locking rib 217 re-interposes itself in the path of return of the stud 354, and the counters remain engaged with the racks during their retirement to again register thereon the amount previously accumulated.

In a totaling or clearing operation, the counters 490 control the advance of the racks 310, which in turn elevate the typecarriers 514 until types 561 corresponding to the total registered on the counters, are brought to the printing line. The printing hammers 510 operate at the end of the forward stroke, to impress the types on the paper, in the usual manner well known in the art.

A suitable line space mechanism normally imparts a step by step rotation to the platen at each operation of the machine. In the present instance, a line space pawl 2614 (Figs. 3, 7 and 8) pivoted at 2053ᵇ to an arm 2016 fast on a gudgeon 2053ª journaled in one of the carriage end plates 2010, engages a ratchet 2020 (Figs. 7, 8, 18 and 19) secured to the platen 2094, to advance the paper in line spacing direction. A spring 2082ᵇ yieldingly holds the line space pawl engaged with the ratchet 2020. Arms 2016ª secured to the gudgeons 2053ª in the opposite end plates, carry a universal line space bail 2002, extending across the machine.

A thrust or pusher bar 2026 extending rearwardly from a rod 302 (Fig. 3) mounted in and connecting the radius bars 323, carries a roll 1 at its rear end normally in contact with the line space bail 2002 to retain the latter at one extreme of its travel against the tension of a spring 2, (Figs. 1 and 4). The bail 2002 normally holds the line space pawl 2614 advanced with the pawl disengaged from its ratchet 2020, as shown in Figs. 7 and 18.

The main drive shaft 200, on its forward stroke, draws the links 214, radius bars 323 and cross rod 302 forwardly, which in turn, retracts the thrust bar 2026. The spring 2 swings the line space bail 2002 forwardly to follow the roll 1, and thereby draws the pawl 2614 idly over the ratchet teeth 2020 preparatory to taking a new bite.

On the return stroke, the thrust bar 2026 forces the universal bail 2002 rearwardly, which drives the line space pawl 2614 forwardly to cause it to enter between two teeth of the ratchet 2020 and turn the ratchet and platen 2094 to advance the paper. Line space regulating means of usual form is provided to enable the paper to be fed one or more spaces at each operation of the machine.

To retain the carriage in different positions relatively to the printing mechanism, a tabulating bar 3 (Figs. 1, 3, 4, 7, 8, 18 and 19) extends between the end frames 2010 of the carriage in which frames it is journaled by trunnions 4. A releasing lever 5 (Figs. 3 and 4) secured at its lower end to one of the trunnions 4, extends upwardly and is slotted to accommodate the platen axle 2004. A spring 6 (Figs. 1, 2, 18 and 19) connected to a prong 3$^a$ projecting from one of the trunnions 4, normally holds the tabulating bar 3 at one end of its oscillatory travel, which is determined by the length of the slot in the releasing lever 5, the rear end of which slot normally contacts the platen axle 2004, as shown in Fig. 3.

Tabulating stops 7 (Figs. 3, 4, 7, 8, 18 and 19) adjustable along the tabulating bar 3 and held where adjusted by the engagement of spring-pressed teeth on the stops with teeth 3$^b$ on the upper edge of the bar, each carry a toe 8 on their inner faces, adapted, under the influence of the spring 6, to contact an abutment 9 protruding rearwardly from the upper rail 2067 of the carriage casting, to hold the carriage at various points in its travel past the printing mechanism, and thus enable one or more vertical lists of figures to be printed at any desired point on the paper.

The usual spring drum 10 (Fig. 1) may be connected by a flexible strap 11 (Figs. 1 and 3) with the traveling carriage, and constantly tends to draw or feed the latter to one end of its path, as in letter spacing direction.

The spring drum 10 holds the tabulating stop 7 firmly against the abutment which, in the present instance, is recessed, as at 9$^a$ (Figs. 7 and 13) to accommodate the toes 8 of the stops, and the walls of the abutment are inclined toward the recess.

Rocking the release lever 5 from its normal position, turns the tabulating bar 3, against the tension of the spring 6, to withdraw the toe 8 of the particular stop 7 at that time in engagement with the abutment, after which the operator may let go of the lever 5, whereupon the feed spring 10 draws the carriage in letter spacing direction. The spring 6 restores the tabulating bar to normal position, with the stops 7 in alinement with the abutment 9, and the carriage continues to travel until the toe of the succeeding tabulating stop rides up the inclined wall of the abutment and finally snaps into the recess 9$^a$ thereof, to lock the carriage in the next columnar position.

Most of the foregoing mechanisms are fully disclosed in the patents heretofore referred to, and constitute a part of the present invention, only in so far as they are combined with the new features now to be set forth.

Limit stops 12 (Figs. 18-20) near the opposite ends of the carriage slide 2065, to which the carriage end plates 2010 are secured, contact a fixed stop 13 (Figs. 7 and 8) mounted in the carriage casting 2067 to prevent disconnection of the carriage slide from its supporting casting or rails, and defines the extreme bounds between which the carriage may travel. The limit stops are situated so as to arrest the carriage at either end of its travel, just before the corresponding end of the platen 2094 carried thereby, uncovers any of the typecarriers 514 of the printing mechanism.

To effect the automatic shuttling of the carriage between two columns, I have contrived novel means to reciprocate the abutment 9, which, for this purpose, is slidable relatively to the carriage casting 2067 instead of being rigidly fixed thereto.

Accordingly, the abutment 9 (Figs. 3, 7, 13 and 24) is made separate from and lies against the outer face of the upper rail 2067 to slide therealong. A laterally extending arm 9$^b$ projecting inwardly from the abutment, rests on top of the rail, which is cut away between its ends, as at 2067$^a$, a sufficient distance to afford room for the reciprocation of the abutment. The arm 9$^b$ of the abutment is secured to a bar 14 slidable in a guide groove 15 formed along the inner face of the upper rail 2067, and communicating intermediate its ends with the recessed outer portion 2067$^a$ of the rail.

Flanged guides 16 (Figs. 13 and 14) fixed at intervals to the rear face of the carriage rail, retain the bar 14 in the guide groove against lateral play. A stop 17 adjustably mounted in one end of the guide groove 15, absolutely limits the travel of the abutment 9 and arrests the carriage against overthrow, by the contact of the end of the bar 14 therewith, and a second stop 18 fixed at the opposite end of the recessed portion 2067$^a$ of the upper carriage rail, in the return path of the abutment 9, arrests the abutment and the carriage at its opposite extreme of travel. Obviously, both the stops 17 and 18 may be adjustable, if desired.

I provide positively actuated means to drive the abutment 9 from its home position or position of rest to one end of its path, and then permit its return to home position under the influence of the carriage feed spring 10 controlled by the positively driven means. The paper carriage, of course, shifts with the abutment, owing to the connection therewith of the tabulating stop 7 on the carriage.

The positive drive of the abutment 9 and paper carriage, away from home position, locates another column opposite the printing mechanism, and is effected from the main drive shaft 200 through a train of mechanism, driven preferably, by the trip or counter-supporting rod 303, which I shall refer to as the actuator.

One end of the trip rod or actuator 303 projects through a trapeziform slot 19 (Figs. 1, 2, 5 and 6) formed in the enlarged forward end of a draft link 20. A guide and supporting pin 21 mounted on the adjacent side frame 967, passes through a longitudinally extending slot 22, also formed in the forward end of the draft link, the rear end of which is pivotally connected at 23, to a rocker 24 journaled at 25 to the side frame.

The actuator 303 when idle (Figs. 1 and 5), lies at the wider rear end of the slot 19 which is given this form to afford room for the arcuate travel of the actuator when the automatic carriage shift mechanism is not in use.

The rearwardly extending shank 26 of a shiftable coupling or latch, pivoted at 27 intermediate its ends, to the forward end of the draft link 20, adjacent the slot 25, carries a shoulder 28, and a spring 29 tends to shift the coupling to interpose the shoulder in the path of the actuator, to confine the latter at the rear end of the slot 19 against independent travel longitudinally thereof, and thus lock the actuator and the draft link 20 together.

An adjustable set member comprising a key stem 31 having a pin and slot connection 32 with the adjacent side frame 967 for guidance, and yieldingly held in effective position by a spring 33, superior to the spring 29, carries a disabling stud 30 normally in contact with a dwell portion 26ª on the forwardly projecting end of the coupling, to hold the locking shoulder 28 out of the path of the actuator 303, against the influence of the spring 29.

An angular locking slot 34 formed in the stem 31, fits over the pin 358 on the side frame.

When the machine is in normal idle position, depression of the key stem 31 against the tension of its restoring spring 33 (Fig. 2), removes the disabling stud 30 from contact with the tail 26ª of the latch or coupling, whereupon, the spring 29 snaps the shoulder 28 into the path of the actuator. Depression of the stem also brings a laterally extending branch of the locking slots 34 into registry with the pin 358, and by rocking the stem rearwardly on the pin 32 as a pivot, the lateral branch of the slot embraces the pin 358 to hold the stem depressed.

Operation of the main drive shaft 200, when the set member 31 is depressed, positively actuates a train of mechanism leading to the paper carriage, to drive the latter from its home position to the opposite end of its path in the following manner.

The main drive shaft 200, on its forward stroke, advances the actuator 303, which is locked by the shoulder 28 of the coupling to the draft link 20, to forcibly advance the draft link. The draft link, in turn, swings the rocker 24 forwardly, to cause a stud 35 mounted in the free end of the rocker, to traverse a cam slot 36 formed in the depending end of a drive lever 37 journaled at its upper end on a cross rod 402, extending between the side frames 967, to thereby shift the drive lever forwardly. A stud 38 mounted intermediate the ends of the drive lever 37, projects into a slot 39 formed in the forward end of a connecting link 40, whose rear end is pivoted at 41, to the outer end of a drive rack 42, (Figs. 1, 2, 15 and 17) to enable the drive lever 37 to draw the rack forwardly.

The rear end of the drive rack 42 enters a guide passage 43 (Figs. 15 and 17) in the wall of a chambered gear casing 44 located in front of the upper carriage rail 2067 adjacent the left hand side frame 967. The guide passage intersects a circular chamber 45 formed in the bottom of the casing.

The pivot 41 permits the link 40 to follow the arcuate path of the stud and enables the drive rack to preserve its rectilinear travel.

A vertical stub shaft 46, whose lower end is stepped in a hollow boss 47 depending from the bottom of the gear casing 44, projects upwardly and centrally through the circular chamber 45, and through a larger communicating chamber 48 above the chamber 45. The inner end of the drive rack 42 meshes with a pinion 49 journaled on the stub shaft 46, and seated in the chamber 45.

The hub of the pinion 49 extends into the upper chamber 48 (see Fig. 15), and has secured thereto, a gear 50 journaled on the stub shaft 46 and partially encircled by the upper chamber, the rear wall of which is cut away to fit against the upper rail 2067 and accommodate the left-hand end of the reciprocatory drive bar 14, which is equipped with teeth 51 at this point, to mesh with the gear 50.

It will be remembered that the bar 14 carries the abutment 9 engaged by the tabulating stop 7 mounted on the paper carriage. The rack 42 rotates the pinion 49 and the gear 50, which latter, drives the toothed bar 14 and abutment 9 toward the right, and the paper carriage, by reason of its connection with the abutment, travels with the latter, against the tension of the carriage feed spring 10. The stroke of the drive lever 37 is sufficient to drive the abutment 9 to the right until the right hand end of the bar 14 just touches the adjustable stop 17, (see Fig. 14). It is obvious that the stop 17 must not restrict the positive drive of the abutment and its drive bar 14, and its main object is to prevent overthrow of the carriage due to momentum, after the positively driven train of mechanism has reached its limit of travel on the forward stroke of the main drive shaft.

The printing operation occurs just before the main drive shaft 200 reaches the end of its forward stroke, and to hold the carriage stationary from the time it reaches the end of its travel, until the main drive shaft completes the remainder of its stroke, so that the printing will be clear and accurately located in the column which has been brought opposite the printing mechanism, I arrange the lower end of the cam slot 36 (Figs. 1, 2, 5 and 6) in the drive lever 37 to substantially conform to the arc of travel of the rocker stud 35 so that when the stud reaches this portion of the cam slot, further travel of the carriage drive mechanism is prevented and the carriage is held stationary in the position to which it has been shifted, to to prevent scattering and blurred printing. At the end of its forward stroke, the main drive shaft 200 is released to the action of the main restoring spring 285, which returns the actuator 303 and connected parts to their home positions, as explained heretofore.

It will be remembered that the coupling 26, when in effective position, confines the actuator 303 to the wider rear end of the slot 19, to prevent longitudinal travel of the rod independently of the draft link 20, although the actuator shifts vertically in the rear end of the slot, accompanied by the yielding coupling.

The actuator, on its return, being still locked against the rear wall of the slot 19, in the draft link 20, forces the draft link rearwardly, and thereby causes the rocker stud 35 to retrace its path in the cam slot 36 to swing the drive lever 37 and its stud 38 to their home positions.

This frees the carriage feed spring 10 for operation and the spring immediately draws the carriage back toward its home position as the drive lever starts its return. The carriage transmits the pull of the spring, through the active tabulating stop 7, to the abutment 9, to restore the latter with the bar 14, and as the bar returns, it rotates the gear 50 and pinion 49 in the reverse direction, to retract the drive rack 42 and link 40, and thereby retains the forward end wall of the slot 39 against the drive stud 38 in the drive lever 37, until the paper carriage is arrested in its home position.

The arrest of the carriage occurs prior to the completion of the return stroke of the train of drive mechanism, and of course, halts further movement of the link 40, so that during the remaining travel of the drive mechanism to its normal position, the drive stud 38 idly moves toward the rear end of the slot 39 in the link 40.

Although the carriage feed spring 10 draws the carriage toward its home position, the positively driven train of mechanism would restore the carriage independently of the spring, until such mechanism comes to rest at the end of the return stroke of the main drive shaft, and in any event, the speed of return of the positively driven train of mechanism regulates and controls the speed at which the carriage travels toward its home position, to prevent a sharp impact and jar when the carriage is arrested.

From the foregoing, it will be seen that an amount can first be printed on the paper and registered on the counters 490, while the carriage is in its home position, after which the stem 31 may be depressed, and the main drive shaft 200 turned, to drive the carriage to the right, and print an amount in a column to the left of that in which the first amount was printed. The carriage returns to its home position during the return stroke of the main drive shaft, so that except during the shuttling stroke, the carriage always remains in its home position.

Novel means are provided to enable the use of the paper carriage, equipped for shuttling action, with various forms having columns arranged different distances apart, and I prefer to effect such adjustments by variously arresting the carriage on its return toward home position, under the influence of the carriage feed spring 10, and thereby correspondingly increase or decrease the distance through which the carriage is positively driven.

It must be remembered, however, that the positively driven train of mechanism is positively returned, and that no arrest of the carriage should occur which would prevent the return of the positively driven mechanism.

I, therefore, provide the stud and slot connection 38, 39 between the positively driven lever 37 and the paper carriage, which enables me to adjustably arrest the paper carriage at any of a number of points within the scope of travel of the stud 38 in the slot 39, without interfering with the return of the drive lever 37.

Obviously, by arresting the carriage at different points during its spring-actuated return, I vary the position of the right-hand column (printed when the carriage is in its leftward or home position) relatively to the left-hand column (printed when the carriage is at the end of its positively driven stroke to the right).

A convenient adjustment includes arm 52 (Figs. 1, 13, and 15) journaled on the upper end of the stub shaft 46 and adapted to sweep over a series of graduations or apertures 53 formed in a locking plate 54, which plate also serves as a cover for the chambered gear casing 44 to prevent the entrance of dirt. A spring-pressed stop pin 55 mounted in the arm 52, enters any one of the apertures 53, and any one of a corresponding series of registering apertures 53ª formed in the wall of the gear chamber 48, which brace and hold the pin firmly against movement. The pin 55 projects into the path of a stop member 56 (Figs. 14 and 17) comprising, in the present instance, a shoulder formed on the periphery of a disk 57 secured to the gear 50, and preferably of larger diameter than the gear. The shoulder 56 extends circularly part way around the disk 57 to prevent the introduction of the stop pin 55 behind the shoulder, which would lock the shuttling mechanism against operation by preventing rotation of the gear 50.

The apertures 53 are preferably arranged a type space apart, and the first aperture of the series is so located that when the stop pin 55 is set therein, it will be contacted by the stop shoulder 56 when the paper carriage has substantially reached that point on its return travel to which it would be restored under the influence of the positively driven train of mechanism, providing the carriage feed spring 10 was omitted. The arrest of the carriage at this point, arrests the link 40, with its slot 39, the length of which latter must be sufficient to permit the idle travel of the drive lever 37 and its stud 38 relatively to the link, during the remainder of the return stroke of the drive lever, the length of the slot 39 governing the number of adjustments permitted.

The stop pin 55, when set in the second and succeeding apertures 53, enables the carriage feed spring 10 to draw the carriage on a continuation of its return travel, a successively greater number of type spaces, and consequently, by permitting the link 40 a continuation of travel, reduces the idle travel of the drive stud 38, in the slot 39.

Even when the stop pin 55 is set in the last aperture 53 which permits the greatest separation between the two printed columns, there will be a slight idle travel of the drive stud 38 in the slot 39, that is, the carriage will be arrested before the drive lever 37 completes its stroke. When set in the first aperture 53 of the series, the pin allows the minimum separation between the columns, by arresting the carriage at the earliest practicable point on its return toward home position. The position of the stop pin 55 determines the home position of the paper carriage and enables the space left between parallel columns to be readily varied with great minuteness.

Obviously, if the paper carriage is arrested by the stop pin 55 as soon as practicable, having regard for the positive return stroke of the drive lever 37 and the length of the slot 39, then the lever and its drive stud 38 will travel idly a greater distance along the slot, at the end of the return and the beginning of the forward strokes of the main drive shaft, than if the arrest of the carriage is delayed until the drive lever has nearly reached its normal position.

The fixed stop 18 in the return path of the abutment 9, prevents the travel of the carriage past its extreme home position, as determined by the farthest aperture 53, in cases where the stop pin 55 is withdrawn from the locking plate 54 and held inoperative.

If no relative adjustment of the parallel columns was permitted, the connection between the drive lever 37 and the link 40 might be pivotal alone, without the provision for relative travel.

To prevent rebound of the paper carriage upon the contact of the stop shoulder 56 with the stop pin 55, or of the abutment 9 with the fixed stop 18, I provide a locking dog 58 (Figs. 1, 2, 13 and 17) conveniently located above the link 40. The forward end of the dog is slotted, as at 59 (Figs. 1, 2, 5 and 6) to accommodate a retracting pin 60 projecting from the drive lever 37, and a spring 61, connecting the lever and dog, normally tends to force the dog rearwardly, so that the retracting pin 60 lies at the forward end of the slot 59. The rear toothed end of the dog 58 enters the gear casing 44 to engage any of a series of serrations 62 (Figs. 13 and 14) formed on the periphery of the stop disk 57. A flanged guide 63 (Figs. 1 and 2) secured to the link 40 and extending over the dog 58, restricts lateral play thereof. The locking serrations 62 are arranged so that the first tooth or indentation thereof registers with the toothed end of the dog, as the stop shoulder 56 reaches the first graduation or aperture 53. The second of the teeth or indentations 62 similarly corresponds with the second aperture 53 and so on. Hence, no matter in which of its home positions the carriage may be arrested, the dog 58 will lock it against rebound.

The dog 58 must be withdrawn prior to the actuation of the drive rack 42, to effect which, the slot 39 in the link 40 is made longer than the slot 59 in the dog 58, so that even though the paper carriage is arrested in the last of its home positions, at which time the lever stud 38 is nearest the forward end of the slot 39 when the machine is at rest, there is still a slight space between the lever stud and the forward end of its slot, whereas, the retracting pin 60 is practically in contact with the outer end of the dog slot 59 at all times.

The slot 59 and spring 61 enable the dog to yield forwardly as the locking serrations 62 ride under the tooth of the dog, and then shift backwardly to enter the succeeding serration. Also, the slot and pin connection between the dog and the drive lever permits the dog to accommodate itself to the arc of travel of the lever.

On the forward stroke of the drive lever 37, the retracting pin 60 withdraws the dog 59 from engagement with the serrations 62 of the stop disk 57 prior to the advance of the drive rack 42. On the return stroke the spring 61 holds the outer end of the slot 59 of the dog against the retracting pin 60 until the rear end of the dog strikes the edge of the stop disk 57, which occurs just prior to the end of the return stroke of the drive lever. The disk arrests the return travel of the dog 58, whereupon, the pin 60 traverses the slot 59, until the disk, during its rotation, brings the first indentation 62 into registry with the dog 58. The spring 61 then snaps the dog into the indentation and brings the forward end of the slot 59 toward the pin 60.

One of the valuable features of my invention, which, so far as I am aware, is absolutely novel, is the provision of carriage-controlled means to disable the positively driven train of mechanism and thereby prevent the carriage from moving out of its home position to its shuttled position, when the shuttling throw would tend to shift the carriage limit stop 12 past the fixed stop 13 in the direction in which the carriage is positively driven.

Such disabling mechanism is devised to protect the machine from injury in case the operator carelessly adjusts the mechanism, so that when the carriage is in its home position, the distance between the limit stop 12 and the fixed carriage stop 13, in the direction of carriage travel, is less than the positive throw which will be imparted to the carriage by the shuttling train of mechanism. Obviously, to permit the shuttling mechanism to operate under such conditions would result in locking up the machine, and probable damage to the parts, as the main drive shaft could not complete its forward stroke before the limit carriage stop 12 struck the fixed carriage stop 13.

The particular form of shuttle disabling mechanism which I have selected for illustration herein, includes a roll or wiper 64 (Figs. 1, 2, 13 and 14) mounted on the carriage and adapted to depress a contact leaf 65 (Figs. 4, 12, 13 and 14) hinged at 66 to the drive bar 14, to travel therewith. The contact or leaf depends in front of the outer face of the upper carriage rail 2067 and is preferably as long as, or a trifle longer, than the longest throw of which the carriage is capable in a shuttling operation.

A stud 67 extending transversely through and slidable relatively to the upper carriage rail 2067, has a tapered end 67$^a$ which normally presses against the rear face of the contact to swing it rearwardly away from the outer face of the carriage rail into the path of the wiper 64, as shown in Figs. 11 and 13. The contact 65, as it travels with the drive bar 14 toward the right, may finally escape from the projecting end of the positioning stud 67, but the tapered end of the stud enables the contact to easily ride back up on the end of the stud during the return of the drive bar.

A spring 68 connected to a link 69 presses a foot 69$^a$ on the rear end of the link against the head 67$^b$ of the stud 67 to hold it projected. Lips 70 (Figs. 13 and 14) on the frame, embrace the link to guide it. The forward end of the link 69 pivotally connects at 71 (Figs. 1, 9 to 12) to the inner one of a pair of trip fingers 72, 73 secured together by a hub 74 having its bearing on the outer end of the journal of the cross rod 265, supported in the side frames 967.

The pivot pin 71 connects and braces the trip fingers 72, 73. The depending end of the inner trip finger 72 lies in the path of, and substantially in contact with, the arm 317$^b$ of one of the set levers 317$^a$, and the outer trip finger 73 carries a trip stud 75 normally located adjacent a releasing cam 76 formed on the stem 31 of the shuttle control key.

When the stem 31 is in its normal position, the release cam 76 lies out of the path of the trip stud 75, but upon depressing and rocking the stem rearwardly to lock it in actuated position, the cam 76 is thereby brought into close juxtaposition to the releasing stud.

If, while the shuttling mechanism is thus set for operation, the operator, in adjusting the carriage, shifts it so that its left hand limit stop 12 is brought too close to the stationary limit stop 13, the wiper 64 on the carriage will thereupon contact the leaf 65 and force it against the face of the carriage rail 2067, as soon as the distance between said limit stop 12 on the carriage and the fixed stop 13 on the carriage supporting frame, becomes less than the throw of which the carriage is capable when shuttling.

The contact, in turn, presses the positioning stud 67 inwardly against the link 69, to advance the latter and rock the trip fingers 72, 73 to force the trip stud 75 against the cam 76 on the stem 31, and thereby rock the stem to disengage it from the locking stud 358. Thereupon the spring 33 snaps the stem to its opposite limit of travel, as determined by the length of the slots 32 and 34, and causes the disabling stud 30 to strike the tail 26ᵃ of the coupling 26 and shift the lip 28 of the latter out of the path of the actuator 303 against the tension of the inferior spring 29.

The positive drive train is thus disabled prior to the actuation of the main drive shaft to prevent a shuttling operation of the carriage.

Should the paper carriage be shifted to a position which brings the wiper 64 into contact with the leaf 65 prior to the actuation of the stem 31 against the tension of its spring 33, the tripping stud 75 will be shifted to a position beneath the cam 76 (as shown in Fig. 10) to prevent actuation of the stem so long as contact between the wiper and leaf is maintained.

Furthermore, the trip finger 72 lies just in front of the arm 317ᵇ of the set lever 317ᵃ, (see Fig. 9) so that depression of the totaling or clearing key 327 rocks the set lever and forces the arm 317ᵇ against the trip finger 72 which, through its connection with the trip finger 73, effects the release of the set member 31, if depressed, in the same manner as when the trip fingers are operated by the carriage as above explained, or locks the set member against depression.

This enables the operator to locate the total underneath the accumulating column of amounts and prevents the possibility of improper operation.

Obviously, in shuttling operations, it is desired to print the designating number and its correlated amount on the same horizontal line, that is, the two items which are printed, the one when the carriage is at the end of the shuttle stroke, and the other when the carriage is in its home position.

This may be easily effected by simply disabling the line spacing mechanism on every alternate or shuttle stroke, and I have arranged to control the operation of the line sp... mechanism, directly from the drive ... instead of from the carriage.

An extension 77 (Figs. 1, 2, 4, 7 and 8) of the draft link 20, projects rearwardly and terminates in a cam nose 77ᵃ normally adapted to contact a pin 78 on an upwardly extending arm 79 fastened to one end of a shaft 80 journaled in lugs 81, 81ᵃ depending from the lower carriage rail 2067, to hold the arm 79 and shaft 80 at one extreme of their rotation against the tension of a spring 82. The shaft 80 extends inwardly to about the longitudinal center of the carriage.

A spring 83 connects an operating arm 84 secured to, and depending from the inner end of the shaft 80, with a stud 85 mounted in a depending arm 86 journaled in the lug 81ᵃ at a point in rear of, and parallel with the shaft 80, so that the arm 86 lies behind the operating arm 84. A bell crank 87, one arm of which is loosely mounted on the shaft 80, carries a roll or check 88 on its remaining rearwardly projecting arm, and the stud 85 on arm 86 projects through a slot 87ᵃ in the bell crank 87. Hence, the spring 83 constitutes a flexible link between the operating arm 84 and the bell crank 87 through the pin and slot connection 85, 87ᵃ to permit relative movement of the operating arm 84 and bell crank 87. The slot 87ᵃ accommodates the arc of travel of the stud 85, which differs from the arc of travel of the bell crank because the fulcrums of the bell crank 87, and of the arm 86, do not correspond.

The extension 77, by its pressure against the pin 78, holds the operating arm 84 forwardly, and slightly tensions the spring 83 to cause the latter to draw the arm 86 and its stud 85 forwardly. The stud 85 contacts the wall of the slot 87ᵃ to rock the bell crank 87 and check 88 to, and hold them in, lowered or idle position out of the path of the universal line space bail 2002, against the tension of the operating spring 82.

Operation of the main drive shaft 200, with the coupling 26 in effective position, advances the draft link 20, which, as it commences its advance, withdraws the extension 77 and frees the arm 79 to the action of the spring 82. The spring 82 rocks the arm 79, shaft 80, and the operating arm 84, to swing the latter rearwardly, into contact with the stud 85 to shift the bell crank 87 and interpose the check 88 into the path of the universal line space bail 2002, as shown in Figs. 2 and 8. The check, in this position, prevents the line space bail from following up the thrust bar 2026 as the latter is advanced on the forward stroke of the main drive shaft, and thereby holds the line space pawl 2614 in its advanced position to prevent it from taking a new purchase on the line space ratchet 2020 preparatory to feeding the paper in line spacing direction.

The draft link 20, near the end of its return stroke, restores the extension 77, with a chopping motion to wipe the cam nose 77ᵃ along the pin 78, and thereby rock the arm 79, shaft 80, and operating arm 84 to normal position against the tension of the operating spring 82. The operating arm 84, as it swings forwardly, advances the connecting spring 83, which in this operation, merely serves as a link, to draw the stud 85 and its supporting arm 86 downwardly, and thereby rock the bell crank 87 and its check 88 to idle position.

It is often desirable to prevent the addition on the counters 490, of the numbers printed in one of the columns, and I have shown such a mechanism, operable when the paper carriage is at the end of its shuttle throw, that is, when in the position opposite its home position, to mechanically effect this result in a simple and novel manner.

The Wales calculating machine has heretofore been equipped with non-add mechanism, including hooks or detents 417 (Figs. 1, 2, 5 and 6) secured to the projecting ends of a cross shaft 404 journaled in the side frames 967 and rocked by a key (not shown) to swing the detents beneath the opposite ends of the counter axle 400 while the latter is in normal position, and thus prevent the engagement of the counters 490 with their racks or drive members 310 (Fig. 3) even when the counter-supporting props 319 and detaining members 316 are displaced.

Spring 481 restores the detents 417 to idle position, after the trip rod 303 again becomes effective, through the counter-supporting props 319, to sustain the counter axle and counters in normal disengaged position.

Shifting the detents 417 to effective position, forces a stud 457 on one of the hooks or detents 417 to contact the tail of a latch 619 to rock the opposite slotted end of the latch over a pin 254ª on the key-controlled slide 320 to lock the latter and its key 327 against operation, as shown in Fig. 2. Otherwise, the non-add mechanism would nullify the action of the total and clearing mechanism controlled by the key 327, and render its operation idle.

For a more complete understanding of the non-add mechanism, reference is directed to patents to McFarland, 880,159, February 25, 1908, and 1,024,013, April 23, 1912.

I directly actuate the usual non-add detents 417 by the positively driven train of mechanism, heretofore explained.

Thus, a cam 89, journaled on a cross shaft 402, is provided with ears 89ª adapted to loosely embrace a finger 90 on the drive lever 37. When the drive lever is in its normal position (Figs. 1 and 5) the finger 90 lies close to the forward ear 89ª. When the drive lever commences its forward stroke, the finger will contact the ear and swing the cam 89 forwardly to wipe against the stud 457 on the adjacent detent 417 and rock the detents to effective position before the counter-supporting mechanism is tripped.

As the drive lever 37 approaches the end of its stroke, it brings a recess 91 formed near one end of the working face of the cam, into registry with the stud 457, which snaps into the recess, due to the tension of the restoring spring 481, to enable the cam to hold the non-add detents 417 effective during the return stroke of the drive lever. The drive lever 37, on its return to normal position, withdraws the finger 90 from the forward ear 89ª of the cam, and were it not for the detaining recess 91, the tension of the restoring spring 481 would return the non-add detents to idle position at this time.

The cam, however, retains the detents effective until the drive lever, near the end of its return stroke, impinges its finger 90 against the rearmost ear 89ª to reverse the direction of travel of the cam 89 and dislodge the stud 457 from the recess 91, whereupon the restoring spring 481 snaps the detents 417 to idle position, and in so doing, rocks the cam 89 rearwardly independently of and relatively to the drive lever 37, until the foremost ear 89ª again lies adjacent the finger 90.

Assuming that the stem 31 is held depressed, the main drive shaft 200, at each operation, will positively actuate the train of mechanism including the shiftable coupling 26, to drive the paper carriage from its home position to its opposite limit of travel, and then permit the carriage feed spring to return the carriage to home position.

This would, of course, permit printing in one column only and that column located at the end of the carriage travel opposite its home position.

The stem 31, however, is only designed for individual operation when it is desired to print an occasional number in a column to the left of the column in which a list of several accumulated amounts are printed, to designate such amounts; and to relieve the operator of the necessity for remembering to release the stem from its detaining stud 358, I provide means to mechanically release the stem.

A pawl 92 (Figs. 1 and 2) conveniently pivoted on the disabling projection 30 of stem 31, carries a stop lug 92ª on one arm, held by a spring 93 against the stem 31.

When the setting stem 31 is depressed, and then rocked on the guide pin 32 as a pivot, to cause the lateral arm of the locking slot 34 to embrace the detaining stud 358, the lower end of the stem rocks forwardly, to enter the free arm of the pawl 92 into the path of a tappet 94 mounted on the locking segment 211 fixed to turn with the main drive shaft (Fig. 2).

On the forward stroke of the main drive shaft, the tappet 94 wipes idly past the pawl 92, swinging the latter against the tension of the spring 93, but as the drive shaft approaches the end of its return stroke, the tappet strikes the pawl, which is then prevented from yielding, by the contact of the stop lug 92ª with the stem 31, to force the pawl rearwardly, thereby rocking the lower end of the stem 31 rearwardly on guide stud 32 as a fulcrum, and the upper end of the stem forwardly, to register the vertical branch of the angular locking slot 34 with the detaining stud 358. This frees the stem to the action of the restoring spring 33, which snaps the stem upwardly and brings the disabling stud 30 against the tail 26ᵃ of the coupling 26 to shift the latter to, and hold it in, idle position, and thereby render the shuttling mechanism inoperative.

When the setting member 31 is in normal position, (Fig. 1) the pawl 92 lies out of the path of the tappet 94.

To print parallel vertical columns of numbers and amounts, respectively, I arrange to automatically shuttle the paper carriage, not on every stroke, but on every alternate stroke, whereby to print in the respective columns alternately.

In effecting this result, I utilize the drive train of mechanism heretofore set forth, and instead of employing a separate means to set such carriage-driving mechanism for operation, I arrange to make use of the same setting device or stem 31, so that it is only necessary to provide means to automatically and successively shift the stem to one of its positions, and release it to enable its return to the other of its positions, on alternate strokes of the main drive shaft.

By so doing, I retain the non-adding and line space disabling functions associated with the drive mechanism, so that I can print each number on the same horizontal line with the amount to which it relates, and at the same time, prevent the accumulation of the numbers on the counters.

Also, as on every other or alternate stroke, the machine operates normally, the shuttle mechanism being disabled, I effect the line spacing of the paper to vertically separate each two horizontally alined printed items, and accumulate the items printed in one of the columns.

As a result, I obtain a list of non-added number printed in a vertical column parallel with and preferably to the left of a column of accumulated amounts.

A stem 95 (Figs. 1, 2, 5 and 6) conveniently located adjacent and behind the stem 31, is slotted at 95ᵃ (Fig. 5) near its lower end, to accommodate the guide pin 32, an angular locking slot 95ᵇ being formed near the upper end of the stem, through which the detaining stud 358 projects, and a spring 96 (Figs. 1 and 2), normally holds the stem 95 at one limit of its travel. An actuating lever or detainer 97, pivoted at 98 to an offset 95ᶜ on the stem 95, carries a wiping stud 99 adapted to coact with a shoulder 100 projecting from and forming a part of the set member 31 to depress the latter and hold it where adjusted. The outer end of the shoulder 100 terminates in a cam 100ᵃ with which the wiping stud 99 coöperates.

When both the setting stem 31 and the controlling stem 95 are in their normal positions, (Fig. 1) the wiping stud 99 seats at the juncture of the shoulder 100 and the stem 31, in which position it is normally held by a spring 101 connected to the lever 97 and to the offset 95ᶜ. The lever 97 is normally inclined at an angle substantially equi-distant from the sides of the angle formed by the stem 31 and the shoulder 100.

When the control stem 95 is depressed, the lever 97 transmits the pressure to the set stem 31, vertically depressing the latter, to displace the disabling stud 30 and free the coupling 26 for operation. The control stem is then latched in depressed position, over the locking stud 358, but the set stem is not latched, and would restore to normal, were it not for the detainer 97.

Operating the main drive shaft 200, on its forward stroke, actuates the shuttle mechanism to drive the paper carriage to its opposite limit of travel, disables the line space mechanism, and shifts the non-add mechanism to effective position, as heretofore explained.

But since it is necessary to render the foregoing mechanism idle on the next succeeding forward stroke, I arrange to displace the detainer 97 on the forward stroke during which the shuttle mechanism operates.

To automatically withdraw the detainer 97 from the position in which it holds the set member 31 depressed, after the carriage drive mechanism operates to shift the carriage to that limit of its travel opposite its home position, I pivotally secure a self centering driver 102 to a moving part of the mechanism opposite the detainer 97, for instance, to the counter-supporting prop 319, at 103; adapted to contact one or the other of two operating studs 104, 105 mounted on the detainer on opposite sides of its fulcrum 98.

A spring 106 connected at one end to a tail 102ᵃ of the driver 102 and at the other end to a post 106ᵃ on the prop 319, holds the driver in a normal position to contact whichever stud 104 or 105 is brought into its path. The driver has a concave face 102ᵇ to insure its contact with the studs, and to center the driver relatively to the stud being operated upon, so that the pivot point 103 of the driver will be in line with the operated stud 104, or 105, and the driver will thus be automatically positioned to escape the remaining stud.

When the machine is idle, the driver 102 may conveniently rest on the upper edge of the bridle link 321, which it parallels.

Normally, due to the inclination of the actuating lever 97, its lower stud 105 lies opposite the driver 102 and just beyond its path, whereas the upper stud 104 lies in a vertical plane intersecting the path of the driver, and above the latter.

Depression of the control member 95 causes the actuating lever or detainer 97 carried thereby, to depress the set member, without changing the degree of inclination of the detainer, and brings the upper stud 104 into the path of the driver 102.

The main drive shaft 200, upon its forward stroke, advances the actuator 303 to drive the carriage shuttling mechanism, and the actuator also swings the counter-supporting prop 319 forwardly, to advance the driver 102 along the bridle link 321, so that the driver rides off of the link, the link meanwhile being rocked downwardly by the actuator 303, which aids in freeing the driver to the action of its centering spring 106.

Near the end of the forward stroke, the upper edge of the socketed face $102^b$ of the driver 102 contacts stud 104 above the fulcrum 98 of the detainer 97, and as the driver continues to advance, it automatically centers the face $102^b$ relatively to the stud 104, so that the longitudinal axis of the driver lies in line with the fulcrum 103 and the stud 104, and causes the lower edge of the driver to shift out of the path of the stud 105.

Further advance of the driver 102 rocks the detainer 97 on its fulcrum 98 to reverse its position relatively to the shoulder 100 of the set member 31.

The reversal of the detainer occurs near the end of the forward stroke of the main drive shaft, and displaces the wiping stud 99 from the shoulder 100 to free the set member to the action of its restoring spring 33, which snaps the set member 31 and its disabling stud 30 back to normal position (Figs. 1 and 5). At the end of such forward stroke, however, the tail $26^a$ of the coupling 26 in the train of drive mechanism, has been advanced beyond the disabling stud 30, so that the disabling stud merely enters the path of return of the tail $26^a$. As the main drive shaft and actuator approach the end of the return stroke, the tail $26^a$ of the coupling is brought against the disabling stud 30, and rides up on the stud to thereby shift the lip 28 of the coupling out of the path of the actuator 303. The tail remains in contact with the disabling stud at the end of the return stroke, to maintain the coupling idle.

The driver 102 recedes from the operated stud 104 on the return stroke, and rides up on the bridle link 321. Also, the set member 31, on its restoration, carries with it the shoulder 100 to position the cam $100^a$ thereof in the path of the wiping stud 99, on the detainer.

The paper carriage restores to its home position on the return stroke of the main drive shaft, in a shuttling operation, and by the automatic displacement of the coupling 26, the shuttling mechanism is rendered ineffective, so that the carriage remains in its home position throughout the succeeding stroke.

The face $102^b$ of the driver is of sufficient width to engage both operating studs 104, 105, at a time, but owing to its self-centering action, it shifts out of the path of the idle stud, whether it happens to be the lower or the upper one, to enable such idle stud to assume its rearward position, as the other stud is being operated upon, so that such idle stud may be acted upon, on the succeeding forward stroke.

Hence, at the end of the forward stroke of the main drive shaft, in a shuttling operation, the lower operating stud 105 of the actuating lever detainer 97, has been shifted rearwardly and lies below the driver 102, and in a vertical plane intersecting the path of the driver, with the cam $100^a$ of the shoulder bearing against the wiping stud 99, to maintain the detainer in reversed position, against the tension of the spring 101 (Fig. 5). The lower operating stud 105 now lies nearer the driver than does stud 104, which has been rocked forwardly during such forward stroke.

Under this adjustment, when the main drive shaft 200 starts on its forward stroke, succeeding that whereon a shuttling operation occurred, it advances the actuator 303, which idly traverses the trapezoidal slot 19 in the draft link 20 without actuating the latter.

Also, the driver 102 rides off the bridle link 321 near the end of the forward stroke, and is shifted by the centering spring 106 so that the lower edge of its socketed face $102^b$ will strike the lower (and at that time, nearer) operating stud 105, and center the driver relatively thereto. Continued advance of the driver will now rock the detainer 97 and crowd the wiping stud 99 along the cam $100^a$ of the shoulder 100 to force the stem 31 downwardly and withdraw the disabling stud 30 from the tail $26^a$ of the coupling 26 to free the latter to the action of its spring 29.

The wiping stud 99 reaches the shoulder 100 at about the end of the forward stroke, at which time, the detainer has been swung on its pivot 98 to place the stud 104 in the path of the driver 102 on its next stroke, whereupon, the spring 101 snaps the stud 99 into the angle formed by the stem 31 and shoulder 100, thereby locating the operating studs 104, 105 in their former or originally described positions, relatively to the driver 102, and the detainer 97 locks the stem 31 in depressed position (Fig. 6).

The coupling spring 29 rocks the coupling 26 toward effective position as the disabling stud 30 is withdrawn, but at this time, the actuator 303 is advanced along the slot 19 beyond the lip 28. As the actuator returns to its normal position, however, on the return stroke of the main drive shaft, it rides over the lip 28, which yields and then snaps into the path of the actuator, under the influence of the spring 29, so that the paper carriage will be shuttled on the succeeding stroke.

Depression of the set member 31 by the control stem 95 does not rock the lower end of the set member carrying the pawl 92 into the path of the tappet 94 on the segmental plate 211, and hence under this adjustment, the tappet is idle.

As in the case of the set member 31, it is also desirable to effect the release of the control key stem 95 from the carriage, when an attempt is made to adjust the latter so that the distance between the leftward limit stop 12 on the carriage and the fixed stop 13 on the frame is less than the shuttling travel of the carriage. It is also desired to enable the total or clearing key 327 to release the stem 95, and to obtain both results, I provide the control key 95 with an enlargement 107 (Figs. 5, 6, 9–11) which, when the stem is depressed and rocked into latched position, enters the path and lies in front of the inner trip finger 72. This trip finger, it will be remembered, is in turn located directly in front of the arm 317$^b$ of the set lever 317$^a$ controlled by the key 327.

Obviously, when the wiper roll 64 of the carriage contacts the leaf 65, during an attempted adjustment such as above referred to, it will rock the trip finger 72 forwardly, as heretofore explained, against the enlargement 107 to rock the control stem 95 forwardly and release it from the detaining pin 358, whereupon, the restoring spring 96 snaps the control key to idle position. If the actuator 97 has been maintaining the set member 31 depressed, the latter will also be released to the action of its return spring 33, which will raise the stem 31 and bring the disabling stud 30 against the bail 26$^a$ of the coupling 26, to disable the latter.

Similarly, depression of the key 327 rocks the trip finger 72 to effect the same result, and it will be noted that the free end of the trip finger, when in its operated position, lies in the path of the enlargement 107 to prevent depression of the controlling key 95, as long as the limit stop 12 on the paper carriage remains too close to the fixed stop 13, or as long as the key 327 remains depressed.

So far as I am aware, no one has ever before combined a mechanically-actuated column tabulating mechanism with a carriage shuttling mechanism, to thereby permit a far more extensive use of the machine upon a variety of classes of work.

To this and other ends, I provide the paper carriage with a simple, mechanically-actuated column tabulating mechanism, operable in conjunction with the carriage shuttling mechanism, and utilizing features thereof in its operation.

Furthermore, the two mechanisms are adapted for conjoint action to effect functions and results not heretofore attained by either, when operating alone.

A shaft 120 (Figs. 1, 2, 4, 18, 19 and 20) journaled in the carriage end frames 2010, carries column stops, including sleeves 121 (Figs. 4, 18, 19 and 20) slidable along the shaft 120 and provided with projecting stop lugs 122, having squared abutting faces 122$^a$ to contact an escapement member 123 when the carriage is traveling in one direction, the opposite or right-hand faces 122$^b$ of the lugs being beveled or inclined to permit the lugs to ride past the escapement member when the carriage is being returned toward the beginning of a line.

Teeth 124 (Fig. 20) formed on the sleeves 121 engage the teeth of a rack 125 mounted on the carriage slide 2065 to hold the stop lugs where adjusted. The lugs are rotatable upon, as well as slidable along, the shaft 120, the shaft having two longitudinally extending peripheral grooves 126, 127 (Figs. 4, 18 and 19) therein, to accommodate the ends of spring-pressed pins 128 carried by the sleeves, to lock the stop lugs against rotation and in effective or ineffective position relatively to the escapement member 123, depending upon whether the sleeves are rotated to enable the pins to enter the lower groove 126 or the upper groove 127.

A key 129 (Figs. 1, 2, 4, 18 and 19) projects above the carriage alongside one of the carriage end plates 2010, and also controls the positions of the stop lugs 122 relatively to the escapement member 123. A pin 130 mounted in the carriage end frame, enters an angular slot 131 formed in the key, to guide the key and to detain it in depressed position against the tension of a restoring spring 132. A shoulder 129$^a$ connects the lower end of the stem 129 with a post 129$^b$, and the post projects through an apertured offset 133$^a$ formed on the free end of a crank 133 fixed at its opposite end to the shaft 120. The post terminates in a lateral lip 129$^c$ to prevent disengagement of the crank and key stem and enables the key to rotate the stop shaft 120 positively in one direction. A normally idle compression spring 134 encircles the post 129$^b$ between the shoulder 129$^a$ and the crank 133, and rests on the crank 133 to enable the key to rock the shaft in the opposite direction.

The restoring spring 132 normally holds the key 129 in raised position, and because of the connection of the lip 129$^c$ with the crank 133, the stop shaft 120 is rocked outwardly to displace the stop lugs 122 relatively to the escapement member 123 so as to lie out of alinement therewith.

Depression of the key 129 against the tension of restoring spring 132, forces the shoulder 129ᵃ to compress spring 134 which transmits the pressure to the crank 133 to rock the shaft 120 inwardly and shift the stop lugs 122 into alinement with their escapement member 123, providing the stop lugs have been rotated on the shaft 120 to enable the locking pins 128 to enter the lower groove 126.

At the same time, the shoulder 129ᵃ contacts the prong 3ᵃ projecting from the toothed tabulating bar 3 to rock the latter outwardly against the tension of its spring 6, and thereby draw the tabulating stops 7 out of alinement with the traveling abutment 9.

If one of the stop lugs 122 has not been interposed directly behind the escapement member 123, the carriage feed spring 10 will immediately draw the carriage in letter spacing direction until one of the stop lugs is arrested by its escapement member.

The column tabulator controlling key 129 is rocked rearwardly after being depressed, to cause the lateral arm of the angular slot 131 to accommodate the locking stud 130, to hold the key depressed.

The escapement member 123 in the present instance, comprises a vertically extending cylindrical body portion 135 (Figs. 4 and 18 to 22) journaled in a bracket 136 projecting from the lower carriage rail 2067, and provided with a head 123 recessed to form the arresting stop 123ᵃ and the interrupting stop 123ᵇ. In practice, the arresting and interrupting stops form a crescent or lunette (Figs. 20 and 21) and a spring 137 connected to the tail of a pawl 138 pivoted at 139 to an arm 140 secured to the lower end of the body portion 135, normally presses the tail of the pawl against the hub of the arm 140, and holds the arresting stop 123ᵃ in the path of the stop lugs 122, (when the latter are in effective position) and the interrupting stop 123ᵇ out of the path of the lugs.

The thrust bar 2026 carries a finger tappet 141, which, as the thrust bar is advanced by the main drive shaft 200 on its forward stroke, wipes idly past the free end of the pawl 138, which yields to the tappet when the latter advances. The thrust bar, on its return, forces the tappet against the pawl, which remains substantially rigid with the arm 140, and hence the tappet rocks the arm and body portion 135 of the escapement member to withdraw the arresting stop 123ᵃ from the path of the particular stop lug 122 at that time in contact therewith. Withdrawal of the arresting stop 123ᵃ, frees the stop lug and the paper carriage to the action of the feed spring 10 which draws the carriage leftwardly.

It will be seen that, so far as has been explained, unless the tappet 141 quickly releases the pawl 138 to enable the spring 137 to immediately restore the arresting stop to effective position, the carriage feed spring 10 will draw the carriage uninterruptedly to the limit of its leftward travel. And heretofore, the operator has accidentally or maliciously effected such a result, in cases where he is able to control the return stroke of the main drive shaft.

To prevent such a contingency, I arrange the interrupting stop 123ᵇ to shift simultaneously with the arresting stop 123ᵃ, and into the path of the stop lug 122 formerly in contact with the arresting stop, as the latter stop releases the lug. Hence, the carriage at this time is fed partway only on its column spacing travel, by the spring 10, its travel being checked by the interrupting stop until, as the thrust bar continues its return stroke, the tappet 141 escapes past the pawl 138 to free the escapement member 123 which immediately returns to its normal position under the influence of the spring 137, and in so doing, withdraws the interrupting stop 123ᵇ from the path of the stop lug 122 and enters the arresting stop 123ᵃ in the path of the succeeding stop lug.

The carriage is thus again freed to the action of its feed spring 10, and completes its column spacing travel, being halted when the succeeding stop lug 122 contacts the arrester 123ᵃ.

In case any of the stop lugs 122 located to the left of the escapement member, are accidentally rotated so that their locking pins 128 lie below the lower groove 126 and an attempt made to return the carriage to the beginning of a line, probable damage would result because the lugs would strike the interrupting stop 123ᵇ, from the opposite direction, to prevent which, I provide the left side of the lower carriage rail 2067 with a cam 142 (Figs. 4 and 21) in line with the head 123 of the escapement member, along which cam such accidentally positioned lugs will wipe, and be restored to position to pass the escapement member, as the carriage returns.

In cross-tabulating work, for which the foregoing mechanism is particularly adapted, it is necessary to disable the line spacing mechanism, until a new line is to be written upon, and I contrive to utilize the same line space disabling check 88 operated by the carriage shuttling mechanism, for this purpose.

In thus operating the check 88, by the column tabulating mechanism, means is provided which will maintain the check effective throughout two or more successive strokes, necessary in listing items in two or more columns across the sheet. Such means conveniently includes a plate 143 (Figs. 4, 18, 19 and 21) lying parallel with and hinged at its lower right-hand edge at 144 to the lower carriage rail 2067, alongside the path of the stop lugs 122 when the latter are in effective position, its left-hand edge being fixed to and supported by the arm 86 (Figs. 1, 3, 7 and 8) journaled in the lug 81ᵃ and carrying the stud 85 projecting through the slot 87ᵃ in the bell crank 87 on which the check roll 88 is mounted. The spring 83 connecting the stud 85 and the operating arm 84 on the shaft 80 tends to hold the upper edge of the plate 143 outwardly from the carriage rail 2067 in position to be contacted by the stop lugs 122, because, in the particular adjustment under discussion, the operating arm 84 remains in its normal position, owing to the contact of the controlling extension 77 with the pin 78 of the arm 79, as shown in Fig. 1.

When the tabulating key 129 is depressed, those lugs which lie opposite the plate 143 are forced thereagainst to rock the plate inwardly and the arm 86 rearwardly against the tension of the spring 83 to cause the stud 85 to swing the bell crank 87 and interpose the check roll 88 into the path of the universal line space bail 2002. The check-controlling plate 143 extends to the left from the farthest point on the right within the limit of travel of the paper carriage to a point just short of the column spacing escapement member 123, so that when the carriage is at the beginning of a line where it is held against the tension of the carriage feed spring 10, by the contact of the first or left-hand stop lug 122 with the arresting stop 123ᵃ, the second column stop, at least, will lie in contact with the plate to hold the check 88 effective.

As the carriage feeds to the left, the succeeding column stop lugs 122 ride up on the plate to maintain the check 88 in the path of the line space bail 2002. The ends of the plate are rounded off, as shown in Fig. 21, to enable the stop lugs to ride onto the plate when the carriage is traveling in either direction.

To prevent the carriage from traveling to the extreme end of its path after printing an item in the last column, the stop lug 122ᶜ (Fig. 4) of the last column stop is made longer than the preceding stop lugs 122, so that it not only contacts the arresting stop 123ᵃ of the escapement member, but also extends down alongside the bracket 136.

Furthermore, by arranging to leave a space between the inner end of the hinged plate 143 and the escapement member, the last effective stop lug, or that farthest to the right (when the operator stands in front of the machine) rides off of the hinged plate just before contacting the arresting stop 123ᵃ, and thereby frees the plate 143 to the action of the tensioned connecting spring 83, which immediately rocks the plate outwardly and causes the arm 86 to return the bell crank 87 and the check roll 88 to idle position.

This occurs at the end of the return stroke of the main drive shaft 200, at the completion of listing in the next to last column, so that when the main drive shaft starts on its forward stroke to list an item in the last column, and in so doing, advances the thrust bar 2026, the universal line space bail 2002 can follow the bar and be returned thereby, to line space the paper preliminary to the return of the paper carriage to the right.

Releasing the key 129 from its locking stud 130, liberates the spring 132, which immediately returns the key to normal position (Fig. 1), thereby withdrawing the shoulder 129ᵃ from the prong 3ᵃ of the tabulating bar 3, and enabling the spring 6 to snap the tabulating bar back to bring the tabulating stops 3 into the path of the traveling abutment 9.

Releasing the key 129 also frees the compressed spring 134 to bring the lip 129 to contact the offset 133ᵃ of the crank 133, whereupon the spring 132, operating through the key 129, rocks the column stop bar 120, and shifts the column stop lugs 122 out of the path of the coacting escapement member 123. The teeth 124 of the column stops remain in mesh with the rack 125 on the carriage slide 2065 when the stops 122 are in either effective or ineffective position, it being necessary, when adjusting the positions of the stops along the shaft 120, for the purpose of arresting the carriage in the proper columns, to manually release the locking pin 128 from the lower groove 126 and rotate the sleeve 121 on the shaft 120 until the locking pin lies above the upper groove 127 before the teeth on the stop release the rack 125. Any stops 122 whose locking pins engage the lower groove 126 will coact with the escapment 123 when the key 129 is depressed. If it is desired to hold certain stops 122 inactive at all times, they are rotated on the shaft 120 until their locking pins register with the upper groove 127.

By operating the handle 145 (Fig. 4) fast on the shaft 120, the latter may be rotated against the tension of the compression spring 134 to release any of the stop lugs 122 from the arrester 123ᵃ in case it is desired to skip a column. The yielding connection between the crank 133 and the post 129ᵇ permits the arm to ride up and down the post in such an operation.

In case it is desired to tabulate non-added numbers, and added amounts in alternate succession across a sheet, my invention provides a very ready means to accomplish this end.

Depression of the controlling key stem 95 renders the shuttling mechanism effective and ineffective, on alternate strokes, as heretofore explained, and the shuttling mechanism, in turn, effects the alternate operation of the line space disabling check 88 and the non-add controlling cam 89.

Depression of the tabulating key 129, while the shuttle controlling key 95 is depressed, renders ineffectual the operation of the shuttling mechanism, because of the disconnection of the tabulating stops 7 from the traveling abutment 9, although the abutment continues to traverse its path on alternate operations of the machine.

The key 129 also renders abortive the shuttle mechanism-controlled line space disabling means, as the check 88 is maintained effective by the stop lugs 122 in contact with the plate 143, until the last column is brought opposite the typecarriers, whether or not the extension 77 contacts the pin 78 on the arm 79 of the shaft 80.

But the non-add controlling cam 89 continues to operate to prevent the addition of numbers on alternate strokes, thus permitting the operator to list a form as follows:

| Non-Add. | Add. | Non-Add. | Add. | Non-Add. | Add. |
|---|---|---|---|---|---|
| 831 | 62 | 972 | 87 | 453 | 43 |
| 796 | 28 | 429 | 16 | 646 | 55 |
| | | | | | 291 total. |

The normal position of the paper carriage, when the shuttle mechanism is set, being at the left hand end of its shuttling stroke, the operator might not know whether the carriage would shift to the right on the next forward stroke or remain in its normal left hand position, were it not for the position of the set member 31 which constitutes an automatic visible signal to accurately apprise the operator as to whether or not the carriage will shift on the next stroke of the main drive shaft.

Thus, if the set key 31 is in its depressed position, the operator will thereby know that the carriage will shift to the right and that any item set up on the keyboard will not be added, but will be printed in the left hand column. On the other hand, if the set key 31 is in its normal restored position, the operator will know that, on the next stroke, any item set up on the keyboard will be added, and that it will be printed in the right hand column, because the carriage will remain in its left hand position.

Changes may be made in the form and arrangement of the several mechanisms herein set forth, and parts may be omitted or otherwise disposed, without departing from the spirit and scope of this invention.

What I claim as new, is:—

1. In a listing machine; the combination with a shiftable paper carriage; an actuator and means to feed the carriage in one direction; of means to positively drive the carriage in the opposite direction against the tension of the carriage feed means, including a drive bar to which the carriage is connected; teeth on the bar; a gear in mesh with the teeth; a train of mechanism to rotate the gear, including a coupling shiftable into and out of the path of the actuator; and adjustable means to normally hold the coupling disabled.

2. In a listing machine, the combination with a printing mechanism; a drive shaft; a shiftable paper carriage; and means to shift the carriage in one direction; of means to positively drive the carriage in the opposite direction, including a drive bar; means to detachably connect the carriage and drive bar; teeth on the drive bar; a gear in mesh with the teeth on the bar; a drive rack to turn the gear; a drive lever connected with the rack; and means to connect the drive shaft and drive lever to rock the latter.

3. In a listing machine, the combination with a printing mechanism; a paper carriage shiftable relatively thereto; and means to shift the carriage in one direction; means to drive the carriage in the opposite direction, comprising a drive shaft; and a train of mechanism between the drive shaft and carriage, including a draft link; a rocker; a drive lever; a drive rack; a compound gear driven thereby; and a toothed drive bar meshed with the compound gear and connected with the carriage.

4. In a column tabulating machine, the combination with a main drive shaft; a shiftable paper carriage; means to feed the carriage in one direction the distance of a column space; and means to positively drive the carriage in the opposite direction a similar distance against the tension of the feed means; of a stationary overthrow preventing stop located in the path of the carriage to arrest the latter at the end of its positive drive stroke.

5. In a listing machine, the combination with a shiftable paper carriage; and means to feed the carriage in one direction; of means to positively drive the carriage in the opposite direction, and then permit it to return under the influence of the carriage feed means, the positive drive means comprising a train of mechanism including a rotatable member, and a loose connection; and adjustable means to arrest the rotatable member, and consequently the carriage, at various positions within the scope of the loose connection, when the carriage is driven by the carriage feed means.

6. In a listing machine, the combination with a shiftable paper carriage; and means to feed the carriage in one direction; of means to positively drive the carriage in the opposite direction against the tension of the feed means, and then permit the return of the carriage to home position under the influence of the feed means, including a toothed drive bar connected with the carriage; a gear in mesh with the bar; and a train of mechanism to turn the gear, and having a loose connection to permit relative movement between the gear and its rotating mechanism; and adjustable means to arrest the gear on the return of the carriage under the influence of the feed means, to vary the home position of the carriage.

7. In a listing machine, the combination with a shiftable paper carriage; and means to feed the carriage in one direction; of means to positively drive the carriage in the opposite direction against the tension of the feed means, and then permit the return of the carriage to home position under the influence of the feed means, including a toothed drive bar connected with the carriage; a gear in mesh with the bar; and a train of mechanism to turn the gear and having a loose connection to permit relative movement between the gear and the train of mechanism; and adjustable means to arrest the gear on the return of the carriage under the influence of the feed means, to vary the home position of the carriage, including a stop shoulder turning with the gear; an adjustable stop pin adapted to enter the path of the shoulder; and means to hold the stop pin where adjusted.

8. In a listing machine, the combination with a shiftable paper carriage; and means to feed the carriage in one direction; of means to positively drive the carriage in the opposite direction against the tension of the feed means, and then permit the return of the carriage to home position under the influence of the feed means; adjustable stop means to arrest the carriage at various points on its return under the influence of the carriage feed means; and locking means to prevent rebound of the carriage upon such arrest.

9. In a listing machine, the combination with a shiftable paper carriage; and means to feed the carriage in one direction; of means to positively drive the carriage in the opposite direction against the tension of the feed means, and then permit the return of the carriage to home position under the influence of the feed means; adjustable stop means to arrest the carriage at various points on its return under the influence of the carriage feed means; and locking means controlled by the carriage drive mechanism, to prevent rebound of the carriage upon such arrest.

10. In a column listing machine, the combination with a shiftable paper carriage; means to feed the carriage in one direction; means to arrest the carriage in a home position; and means to positively drive the carriage in the opposite direction against the influence of the feed means, to another column, and then permit the return of the carriage until it again contacts the arresting means at its original home position; of a dog to lock the carriage against rebound, and controlled by the positive drive means for withdrawal from effective position prior to the operation of the carriage against the influence of the feed means, and freed by the positive drive means for effective operation substantially upon the restoration of the carriage to its home position.

11. In a listing machine, the combination with a traveling paper carriage; means tending to feed the carriage in one direction; and means to arrest the carriage at a predetermined position in its travel under the influence of the feed means; of a normally idle shiftable member connected with the carriage; means, having a lost-motion connection with the shiftable member, to positively drive the latter and the carriage in a direction opposite to that in which it travels under the influence of the feed means; a lock to hold the shiftable member and carriage against rebound on their return to home position; and means to permit the positive drive means to withdraw the lock, prior to the actuation of the shiftable member, the positive drive means adapted to release the lock for effective operation substantially upon the return of the carriage to its home position.

12. In a listing machine, the combination with a traveling paper carriage; means to feed the carriage in one direction; means to arrest the carriage, in its travel under the influence of the feed means, at a predetermined home position; and shiftable means to positively drive the carriage in the opposite direction to that in which it travels under the influence of the feed means, said shiftable drive means adapted to return to normal position, and free the carriage to the action of its feed means, which thereupon restores the carriage to its home position; of a locking means for the carriage; and a flexible connection between the locking means and the shiftable drive means to enable the latter to disable the locking means prior to its actuation of the carriage; and to release the locking means for effective operation substantially upon the return of the carriage to its home position.

13. In a listing machine, the combination with a shiftable paper carriage; means to feed the carriage in one direction; means to positively drive the carriage in the opposite direction against the tension of the carriage feed means; and means to arrest the carriage on its return to home position under the influence of the carriage feed means; of a normally effective locking mechanism to prevent rebound of the carriage, upon its arrest; the carriage drive means adapted to withdraw the locking means prior to its actuation of the carriage, and to free the locking means for effective operation substantially upon the arrest of the carriage at its home position.

14. In a listing machine, the combination with a shiftable paper carriage; means to feed the carriage in one direction; means to positively drive the carriage in the opposite direction against the tension of the carriage feed means; and means to arrest the carriage on its return to home position under the influence of the carriage feed means; of a locking mechanism to prevent rebound of the carriage, upon its arrest; including a serrated member connected with the carriage; and a dog controlled by the carriage-drive means, and normally in engagement with the serrated member.

15. In a listing machine, the combination with a shiftable paper carriage; means to feed the carriage in one direction; means to positively drive the carriage in the opposite direction against the tension of the carriage feed means; and means to arrest the carriage on its return to home position under the influence of the carriage feed means; of a locking mechanism to prevent rebound of the carriage, upon its arrest, including a serrated member connected with the carriage; a dog to coact with the serrated member; a loose connection between the dog and the carriage drive means to enable the drive means to control the dog; and a spring to normally press the dog into engagement with the serrated member.

16. In a listing machine, the combination with a shiftable paper carriage; and mechanism to feed the carriage in one direction; of means to positively drive the carriage in the opposite direction against the tension of the carriage feed means, including a flexible connection to permit a limited relative play between the carriage and its positive drive means; means to variously arrest the carriage when under the influence of its feed means at different home positions within the scope of play permitted by the loose connection; automatically effective locking means to retain the carriage in any of its home positions; and a flexible connection between the locking means and the positive drive means which affords a different amount of relative play between the locking means and positive drive means, from the amount of relative play between the carriage and said positive drive means.

17. In a listing machine, the combination with a shiftable paper carriage; and mechanism to feed the carriage in one direction; of means to drive the carriage in the opposite direction, comprising a drive shaft; and a train of mechanism between the shaft and carriage, including a drive lever, a drive rack, and a pin and slot connection between the lever and rack; means to variously arrest the carriage when shifted by the carriage feed mechanism; a locking dog having a pin and slot connection with the drive lever which permits a lesser degree of relative movement between the lever and locking dog than does the pin and slot connection between the lever and drive rack; a serrated member connected to the carriage and engaged by the dog to prevent rebound of the carriage upon its arrest; and a spring to yieldingly hold the dog effective.

18. In a listing machine, the combination with a carriage support having a fixed stop; a paper carriage shiftable thereon, and having a stop coacting with the fixed stop; and means to drive the carriage in one direction; the carriage being adjustably connected to the drive means; of means controlled by the carriage to disable the drive means when the adjustment of the carriage brings its coacting stop within a predetermined distance of the fixed stop.

19. In a listing machine, the combination with a carriage support having a fixed stop; a paper carriage shiftable thereon, and having a stop coacting with the fixed stop; and means to drive the carriage in one direction; the carriage being adjustably connected to the drive means; of means located in the path of, and controlled by the carriage to disable the drive means when the adjustment of the carriage brings its coacting stop within a predetermined distance of the fixed stop.

20. In a listing machine, the combination with a carriage support having a fixed stop; a paper carriage shiftable thereon and having a stop coacting with the fixed stop; and means to drive the carriage in one direction; the carriage being adjustably connected to the drive means; and means to render the drive means effective or ineffective at will; of means to disable the drive means when the carriage is adjusted relatively to the drive means to such a position that the distance through which the carriage would be driven, would exceed the limit permitted by the coacting carriage stop and fixed stops.

21. In a listing machine, the combination with a carriage support having a fixed stop; a paper carriage shiftable thereon and having a stop coacting with the fixed stop; and means to drive the carriage in one direction; the carriage being adjustably connected to the drive means; and means to render the drive means effective or ineffective at will; of carriage-controlled means to disable the drive means when the carriage is adjusted relatively to the drive means to such a position that the distance through which the carriage would be driven, would exceed the limit permitted by the coacting carriage stop and fixed stops.

22. In a listing machine, the combination with a carriage support having a fixed stop; a paper carriage shiftable thereon, and having a stop coacting with the fixed stop; and means to drive the carriage in one direction; the carriage being adjustably connected to the drive means; of a shiftable contact located at one end of the path of the carriage for operation thereby, and of a length substantially equal to the distance through which the carriage travels under the action of its drive means; and means controlled by the contact to disable the drive means, when the carriage, in its adjustment relatively to its drive means, operates the contact.

23. In a listing machine, the combination with a printing mechanism; a drive bar shiftable relatively thereto; a paper carriage support; a paper carriage shiftable therealong and adjustably connected to the drive bar; means to feed the drive bar and carriage in one direction; means to positively drive the drive bar and carriage in the opposite direction; and coacting limit stops on the carriage and its support, respectively, to define the extremes of travel of the carriage relatively to the printing mechanism; of a contact member associated with, and shiftable relatively to the drive bar and located in the path of the carriage; and trip means controlled by the shiftable contact to disable the positive drive means when the carriage, in its adjustment relatively to the drive bar, operates the contact.

24. In a listing machine, the combination with a printing mechanism; a drive bar shiftable relatively thereto; a paper carriage support; a paper carriage shiftable therealong and adjustably connected to the drive bar; means to feed the drive bar and carriage in one direction; means to positively drive the drive bar and carriage in the opposite direction; a set member to control the actuation of the positive drive means; and coacting limit stops on the carriage and its support, respectively, to define the extremes of adjustment of the carriage relatively to the printing mechanism and drive bar; of a contact member associated with, and shiftable relatively to the drive bar, and located in the path of the carriage; and a trip member controlled by the shiftable contact to release the set member which disables the positive drive means when the carriage, in its adjustment relatively to the drive bar, operates the contact.

25. In a listing machine, the combination with a printing mechanism; a drive bar shiftable relatively thereto; a paper carriage support; a paper carriage shiftable therealong, and adjustably connected to the drive bar; means to feed the drive bar and carriage in one direction; means to positively drive the drive bar and carriage in the opposite direction; and coacting limit stops on the carriage and its support, respectively, to define the extremes of travel of the carriage relatively to the printing mechanism; of a contact shiftably secured to the drive bar; a spring-pressed stud to normally hold the shiftable contact in the path of the carriage; a trip finger; a link between the spring-pressed stud and trip finger; a spring-restored setting key to control the actuation of the positive drive means; a detaining member to hold the setting key in one of its positions against the tension of the restoring spring; and a cam on the setting key located in the path of the trip finger when the key is in locked position, to be struck by the trip finger to release the key which disables the positive drive mechanism, when the carriage, in its adjustment relatively to the drive bar, operates the contact.

26. In a listing machine, the combination with a printing mechanism; and a paper carriage shiftable relatively thereto; of means to drive the carriage in one direction; manually-operable means to set the drive means to operative position; and carriage-controlled means to trip the manually-operable means to disable the drive means.

27. In a listing machine, the combination with a printing mechanism; and a paper carriage shiftable relatively thereto; of means to drive the carriage in one direction, the carriage adapted for adjustable connection therewith; a shiftable contact located in the path of the carriage for operation thereby; and means controlled by the shiftable contact to disable the carriage drive means.

28. In a listing machine, the combination with a printing mechanism; and a paper carriage shiftable relatively thereto; of means to drive the carriage in one direction; the carriage adapted for adjustment relatively thereto to enable printing in any one or more selected columns on the sheet; manually-operable means to set the carriage drive means to effective position; a shiftable contact located in the path of adjustment of the carriage to be operated by the carriage; and release mechanism controlled by the contact to displace the manually-operable means to render the carriage drive means ineffective.

29. In a listing machine, the combination with a printing mechanism; a paper carriage shiftable relatively thereto; means to drive the carriage in one direction; a manually-operable member to enable the carriage drive means to become effective; and means to detain the manually-operable member in operated position; of a carriage-controlled means to release the manually-operable member to disable the carriage drive means, and to prevent subsequent effective actuation of the manually-operable member.

30. In a listing machine, the combination with a printing mechanism; a paper carriage shiftable relatively thereto; means to drive the carriage in one direction; and a manually-set member to enable the carriage drive means to become effective; of a carriage-controlled lock to prevent actuation of the manually-set member.

31. In a listing machine, the combination with a printing mechanism; a carriage shiftable relatively thereto; and means to drive the carriage in one direction; of carriage-controlled locking means to prevent the operation of the carriage drive means.

32. In a listing machine, the combination with a printing mechanism; a carriage support having a fixed stop; a carriage shiftable on the support and having a stop; means to drive the carriage in one direction; the carriage being adjustably connected thereto; and means to set the carriage drive means for operation; of a carriage-controlled means to lock the setting means against operation when the carriage is adjusted, relatively to its drive means, to a point which brings the carriage stop within a predetermined distance of the fixed stop.

33. In a listing machine, the combination with a printing mechanism; a carriage support having a fixed stop; a carriage shiftable on the support and having a stop; means to drive the carriage in one direction; the carriage being adjustably connected thereto; of means to set the carriage drive means for effective operation; a cam on said setting means; a carriage-controlled means, including a trip finger adapted to strike the cam when the setting means is in position to render the carriage drive means effective, to release the setting means and render the carriage drive means inoperative, and to lock the setting means against operation.

34. In a listing machine, the combination with a shiftable paper carriage; means to drive the carriage in one direction; and a manually-operable control member to render the drive means effective or ineffective; of a carriage-controlled means, including a contact member in the path of travel of the carriage; and a trip finger operable by the contact member to release the drive-control member to disable the drive means.

35. In a listing machine, the combination with a shiftable paper carriage; means to drive the carriage in one direction; and a manually-operable control member to render the drive means effective or ineffective; of a carriage-controlled means, including a contact member in the path of travel of the carriage; and a trip finger operable by the contact member to lock the drive-control member against operation to render the drive means effective.

36. In a calculating machine, the combination with an accumulating mechanism; a printing mechanism; a shiftable paper carriage; means to feed the carriage in one direction; means to clear the accumulating mechanism; and means to drive the carriage in the opposite direction; of means controlled by the carriage, and by the clearing means to disable the carriage drive means.

37. In a listing machine, the combination with a paper carriage; means to drive the carriage in one direction, the carriage adjustably connected to said drive means; and means to effect the printing of totals; of means controlled by the carriage, and by the total printing means, to disable the carriage drive means.

38. In a calculating machine, the combination with an accumulating mechanism; a printing mechanism; a shiftable paper carriage; means to drive the carriage in one direction; the carriage being adjustably connected thereto; a special key to control the accumulating mechanism; and a device to set the carriage drive means for operation; of a shiftable contact located at one end of the path traversed by the carriage when adjusted relatively to the drive means and adapted to be operated by the carriage; and trip mechanism controlled by the contact, and by the special key, to release the setting device and disable the carriage drive means, and to lock the setting device against operation.

39. In a listing machine, the combination with a main drive shaft; a printing mechanism; a shiftable paper carriage; line space mechanism operable by the main drive shaft to advance the paper in line spacing direction; and means to shuttle the carriage relatively to the printing mechanism; of means constantly tending to disable the line space mechanism; a device controlled by the carriage-shuttling means, to normally retain the line space disabling mechanism ineffective; and settable means to adjust the carriage-shuttling mechanism for operation upon the rotation of the main drive shaft.

40. In a listing machine, the combination with a printing mechanism; a shiftable paper carriage; line space mechanism therefor; and means to shuttle the carriage in alternately opposite directions relatively to the printing mechanism; of automatically operable means constantly tending to disable the line space mechanism, the shuttling means adapted to positively retain the line space disabling means in its ineffective position when the shuttling means is in idle position, and to release the line space disabling means for automatic operation as the shuttling means is operated.

41. In a listing machine, the combination with a printing mechanism; a carriage shiftable relatively thereto; and line space mechanism, operable by the main drive shaft to advance the paper in line spacing direction; of means constantly tending to disable the line space mechanism; means to retain the disabling means ineffective; and means to shift the carriage and release the line space disabling means for automatic operation.

42. In a listing machine, the combination with a printing mechanism; a paper carriage shiftable relatively thereto; line space mechanism to advance the paper in line spacing direction; and a main drive shaft; of line space disabling mechanism constantly tending to become effective; means to positively restrain the line space disabling mechanism in its inoperative position; a normally idle train of mechanism between the restraining means and the main drive shaft, including a displaceable coupling; and means to control the coupling to enable the main drive shaft during a single cycle of operation, to withdraw the restraining means, and thereby release the line space disabling mechanism for automatic operation, and to thereafter return the restraining means to effective position.

43. In a listing machine, the combination with a printing mechanism; a paper carriage shiftable relatively thereto; line space mechanism; and a main drive shaft; of line space disabling mechanism normally tending to automatically become effective; means to normally restrain the line space disabling mechanism in ineffective position; and means to control the withdrawal of the restraining means by the main drive shaft to free the line space disabling means for automatic operation.

44. In a listing machine, the combination with a printing mechanism; a paper carriage shiftable relatively thereto; line space mechanism; and a drive shaft; of means automatically interposable in the path of the line space mechanism to arrest the latter against effective operation; main shaft-driven means to normally restrain the interposable means from effective operation; and means to control the withdrawal of the restraining means by the main drive shaft, from its effective position to free the interposable means for automatic operation.

45. In a listing machine, the combination with a printing mechanism; a paper carriage shiftable relatively thereto; line space mechanism; and a main drive shaft; of a check shiftable into the path of a part of the line space mechanism to arrest the latter and prevent line spacing; means tending to shift the check automatically to effective position; restraining means operable from the main drive shaft, to hold the check normally ineffective; and controllable means to connect the restraining means and the main drive shaft to enable the withdrawal of the restraining means to free the check for automatic operation.

46. In a calculating machine, the combination with a main drive shaft; a printing mechanism; a paper carriage shiftable relatively thereto; means to feed the carriage in one direction; means, operated by the main drive shaft, to drive the carriage in the opposite direction against the influence of the feed means; a series of counters, and drive members therefor, adapted for engagement and disengagement; of a non-add mechanism actuated directly by the carriage drive means to positively restrain the counters from engaging their drive members.

47. In a calculating machine, the combination with a main drive shaft; a printing mechanism; a paper carriage shiftable relatively thereto; means to feed the carriage in one direction; means, to drive the carriage in the opposite direction; a series of counters, and drive members therefor, adapted for engagement and disengagement; and a non-add mechanism to prevent the engagement of the counters and drive members; of a cam actuated directly by the carriage drive means on the forward stroke of the main drive shaft, to shift the non-add mechanism to and retain it in effective position, and adapted for displacement by the carriage drive means on its return stroke, to enable the return of the non-add mechanism to idle position.

48. In a calculating machine, the combination with a main drive shaft; a printing mechanism; a paper carriage shiftable relatively thereto; means to feed the carriage in one direction; means to drive the carriage in the opposite direction; a series of counters and drive members therefor, adapted for engagement and disengagement; and a non-add mechanism to prevent the engagement of the counters and drive members, including spring-restored counter-supporting members; one of which carries a stud; of a cam actuated directly by the carriage drive means on the forward stroke of the main drive shaft, to wipe along the stud and shift the counter-supporting members to effective position, the cam having a recess at one end in which the stud seats to hold the non-add mechanism effective, and the carriage drive means adapted to retract the cam near the end of the return stroke of the main drive shaft, to release the non-add mechanism.

49. In a calculating machine, the combination with a series of counter and drive members therefor, adapted for engagement and disengagement; and a non-add mechanism to prevent the engagement of the counters and drive members; of a stud on the non-add mechanism; a shiftable cam having a seat therein, to engage the stud and adjust the non-add mechanism to effective position, the stud adapted to enter the seat to lock the non-add mechanism in effective position; and means to actuate the cam.

50. In a calculating machine, the combination with a series of counters, and drive members adapted for engagement and disengagement; and a non-add mechanism to positively restrain the counters from engaging their drive members, including a spring to normally hold the non-add mechanism idle; of a main drive shaft having a forward and a return stroke; and means operated thereby to shift the non-add mechanism to, and hold it in effective position during the forward stroke, and throughout a part of the return stroke, and to release the non-add mechanism to the action of its spring, when the main drive shaft has nearly completed its return stroke.

51. In a calculating machine, the combination with a series of counters, and drive members therefor, adapted for engagement and disengagement; a main drive shaft; and a normally idle non-add mechanism to prevent the engagement of counters and drive members; of means driven from the main drive shaft to control the non-add mechanism, and including an oscillatory drive lever, a displaceable coupling between the drive lever and main drive shaft; a cam to shift the non-add mechanism into effective position and having ears; a finger on the drive lever located between the ears to shift the cam in one direction or the other; the ears being spaced apart a sufficient distance to permit lost motion betwen the finger and one of the ears during the return stroke of the drive lever; and a device to control the displaceable coupling.

52. In a calculating machine, the combination with a series of counters, and drive members therefor, adapted for engagement and disengagement; and a non-add mechanism to prevent the engagement of the counters and drive members; of a stud on the non-add mechanism; a cam to actuate the non-add mechanism to effective position; the cam having a seat to embrace the stud when the non-add mechanism is in effective position, to enable the cam to lock the mechanism where adjusted; ears on the cam; a drive member loosely embraced by the ears, and shiftable relatively to the cam between the ears; and a spring to restore the non-add mechanism and cam to their normal positions upon the release of the stud by the cam seat.

53. In a listing machine, the combination with a printing mechanism; a paper carriage shiftable relatively thereto; means to feed the carriage in one direction; means to arrest the carriage in a predetermined position when under control of the feed means; and a main drive shaft; of mechanically-actuated means to drive the carriage in the opposite direction against the influence of the feed means, to a predetermined position apart from the first-named position, and then permit its return to normal position, under the influence of the carriage feed means during a single cycle of operation of the main drive shaft, automatically on alternate operations of the machine, the carriage adapted to remain at rest during every other alternate operation.

54. In a listing machine, the combination with a printing mechanism; a paper carriage shiftable relatively thereto; means to feed the carriage in one direction, and means to arrest the carriage in a predetermined position when under control of the feed means; of means to positively drive the carriage in the opposite direction, in opposition to the carriage feed means, and then permit the return of the carriage under control of its feed means; and automatically-controlled means to render the positive drive means alternately effective and ineffective on successive cycles of operation.

55. In a listing machine, the combination with a printing mechanism; a main drive shaft having a forward and a return stroke to complete a machine operation; a paper carriage shiftable relatively to the printing mechanism; and means to feed the carriage in one direction; of main drive shaft actuated means to drive the carriage in the opposite direction on the forward stroke and permit the restoration of the carriage under the influence of the carriage feed means, on the return stroke, automatically on alternate complete operations of the machine.

56. In a listing machine, the combination with a main drive shaft; a printing mechanism; a paper carriage shiftable relatively thereto; means to feed the carriage in one direction; and a stop to arrest the carriage in its home position at one end of its path; of means to drive the carriage to the opposite end of its path and then permit its return to home position under the influence of the feed means; and a key-set device to render the carriage drive means automatically effective on alternate operations of the main drive shaft.

57. In a listing machine, the combination with a main drive shaft having a forward and a return stroke; printing mechanism; a paper carriage shiftable relatively thereto; means to feed the carriage in one direction; means to drive the carriage in the opposite direction; key-set mechanism to effect the automatic operation of the carriage drive means on every alternate forward stroke of the main shaft; and carriage-controlled means to disable the carriage drive means.

58. In a listing machine, the combination with a main drive shaft having a forward and a return stroke; printing mechanism; a paper carriage shiftable relatively thereto; means to feed the carriage in one direction; means to drive the carriage in the opposite direction; key-set mechanism to effect the automatic operation of the carriage drive means on every alternate forward stroke of the main shaft; and carriage-controlled means to release the key-set mechanism and thereby render inoperative the carriage drive means.

59. In a listing machine, the combination with a printing mechanism; a paper carriage shiftable relatively thereto; means to feed the carriage in one direction; a stop to arrest the carriage in its home position; means to drive the carriage in the opposite direction, including a displaceable coupling; means to set the carriage drive means for operation, including a coupler-disabling member; a cam shoulder on the setting means; a manually-operable member; a detainer mounted thereon for engagement with and disengagement from the shoulder; a driver adapted to shift the detainer alternately into and out of engagement with the cam shoulder; and means to restore the coupler-disabling member to effective position upon the disengagement of the detainer from the cam shoulder.

60. In a listing machine, the combination with printing mechanism; a paper carriage shiftable relatively thereto; means to feed the carriage in one direction; a stop to arrest the carriage in home position when under the influence of the carriage feed means; means to drive the carriage in the opposite direction; and a manually-operable member to enable the carriage drive means to become effective; of manually-adjustable means to automatically set and release the manually-operable member to render the carriage drive means effective or ineffective.

61. In a listing machine, the combination with a main drive shaft having a forward and a return stroke to constitute a complete operation; a shiftable paper carriage; means to feed the carriage in one direction; means to arrest the carriage in its home position; means to drive the carriage in the opposite direction, including a displaceable coupling; and coupler-controlling means to normally hold the coupling ineffective; of a manually-adjustable means to automatically set and release the coupler-controlling means on alternate operations of the main drive shaft, to render the carriage drive means active or inactive.

62. In a listing machine, the combination with a printing mechanism; a paper carriage shiftable relatively thereto; means to drive the carriage in one direction, including a main drive shaft; and mechanism to render the carriage drive means operative or inoperative; of manually-adjustable means to automatically control the last named mechanism, to render the carriage drive means alternately effective and ineffective, on successive operations of the main drive shaft.

63. In a listing machine, the combination with a printing mechanism; a paper carriage shiftable relatively thereto; means to drive the carriage in one direction, including a main drive shaft having a forward and a return stroke; controlling mechanism to render the carriage drive means effective or ineffective on the forward stroke of the main drive shaft; and means to return the carriage to its normal position of rest during the return stroke of the main drive shaft; of manually-adjusted means to automatically actuate the controlling mechanism on alternate forward strokes of the main drive shaft, to render the carriage drive means effective on the forward stroke, following that on which the controlling mechanism is automatically actuated.

64. In a listing machine, the combination with a printing mechanism; a paper carriage shiftable relatively thereto; means to drive the carriage in one direction; means to return the carriage to its home position; and a disabling device to render the carriage drive means effective or ineffective; of adjustable means to automatically effect the shift of the disabling device, into and out of operative position, on alternate operations of the machine.

65. In a listing machine, the combination with a printing mechanism; a paper carriage shiftable relatively thereto; means to drive the carriage in one direction; means to return the carriage to its home position; and a disabling device to render the carriage drive means effective or ineffective; of adjustable means to automatically effect the shift of the disabling device into and out of operative position, on alternate operations of the machine; and carriage-controlled means to render the adjustable means ineffective, and release the disabling device for operation.

66. In a listing machine, the combination with a shiftable paper carriage; means to drive the carriage in one direction; means to return the carriage to its home position; and a disabling device to render the carriage drive means effective or ineffective; of adjustable means to automatically control the disabling device, to render the carriage drive means effective on alternate operations of the machine only.

67. In a listing machine, the combination with a shiftable paper carriage; means to drive the carriage in one direction; means to feed the carriage in the opposite direction to its home position; and disabling mechanism to control the operation of the carriage drive means; of a detainer to control the disabling mechanism; a driver; and means to releasably adjust the detainer into the path of the driver to effect the automatic actuation of the disabling mechanism, to render the carriage drive means effective or ineffective.

68. In a listing machine, the combination with a shiftable paper carriage; means to feed the carriage in one direction; means to drive the carriage in the opposite direction; and a disabling member to render the carriage drive means operative or inoperative; of control mechanism to automatically shift the disabling member to ineffective position, to enable the operation of the carriage drive mechanism; or to permit the return of the disabling member to effective position, on alternate operations, the control means including a normally idle detainer adapted to shift the disabling member to ineffective position, or to permit the disabling member to become effective; a driver, into whose path the detainer is adjusted, to automatically actuate the detainer in opposite directions alternately, to render the carriage drive means effective or ineffective; and means to releasably hold the detainer in the path of its driver.

69. In a listing machine, the combination with a shiftable paper carriage; means to drive the carriage in one direction; means to restore the carriage to home position; set mechanism to render the carriage drive means effective or ineffective; and means operable upon the set mechanism to cause the latter to normally render the carriage drive means ineffective; of an adjustable control device to shift the set mechanism to a position to render the carriage drive means effective, including a driver, and a detainer adapted to be positioned in the path of the driver to enable the latter to operate the detainer to alternately cause the set mechanism to automatically render the carriage drive mechanism effective or ineffective.

70. In a listing machine, the combination with a shiftable paper carriage; means to drive the latter; and set mechanism to render the carriage drive means effective or ineffective; of a combined actuator and detainer for the set mechanism, adjustable into and out of active position; a driver adapted to operate the combined actuator and detainer when the latter is adjusted to active position, to cause the actuator and detainer to actuate the set mechanism to and hold it in, effective position on alternate operations of the machine.

71. In a listing machine, the combination with a shiftable paper carriage; mechanism to feed the carriage in one direction; means to drive the carriage in the opposite direction against the tension of the feed mechanism, including a displaceable coupling; means to shift the coupling to effective position; and a set member normally tending to disable the coupling; of a cam shoulder on the set member; a pivoted detainer shiftable to contact the cam shoulder and move the set member to ineffective position, to thereby release the coupling for effective operation; a self-centering driver; the detainer adapted to enter the path of the driver for operation thereby, as it shifts the set member to ineffective position; diametrically opposed studs mounted on the detainer on opposite sides of its pivot, adapted to be successively contacted by the driver to rock the detainer alternately off of and on to the cam shoulder to effect the automatic shift of the set member into and out of operative position relatively to the coupling, to render the carriage drive mechanism idle or active.

72. In a listing machine, the combination with a shiftable paper carriage; feed mechanism to draw the carriage in one direction; means to drive the carriage in the opposite direction, including a displaceable coupling; a set member to control the position of the coupling; and means normally maintaining the set member in one of its positions; of a pivoted detainer adapted to shift the set member to the other of its positions to render the coupling effective; a self-centering driver; the detainer adapted to enter the path of the driver for operation thereby as it shifts the set member; opposed studs carried by the detainer on opposite sides of its pivot, one or the other of which studs lies in the path of the driver to be struck thereby, to successively rock the detainer into and out of engagement with the set member to automatically control the position of the coupling.

73. In a listing machine, the combination with a shiftable carriage; means to feed the carriage in one direction; means to drive the carriage in the opposite direction; a set member to render the carriage drive means effective or ineffective; and restoring means to yieldingly retain the set member in one of its positions; of a cam shoulder on the set member; a pivoted detainer having studs on opposite sides of its pivot and adapted to be shifted to contact the cam shoulder and adjust the set member to another of its positions, to render effective the carriage drive mechanism; and means to rock the detainer out of and into engagement with the cam shoulder on the set member, to release the latter to the action of its restoring means, or depress it against the tension of its restoring means, to automatically and alternately disable and enable the carriage drive means.

74. In a listing machine, the combination with a shiftable carriage; means to feed the carriage in one direction; means to drive the carriage in the opposite direction; a set member to render the carriage drive means effective or ineffective; and restoring means to yieldingly retain the set member in one of its positions; of a cam shoulder on the set member; a pivoted detainer having studs on opposite sides of its pivot, and adapted to be shifted to contact the cam shoulder and adjust the set member to another of its positions, to render effective the carriage drive mechanism; a pivoted reciprocatory driver having a centering spring, and a concave face, one of the studs on the detainer adapted to enter the path of the driver when the detainer is first shifted to adjust the set member to render the carriage drive means effective; the driver adapted to strike the stud on its forward stroke, to rock the detainer off of the cam shoulder and release the set means for restoration, to disable the carriage drive mechanism, the detainer when thus rocked, adapted to shift the opposite stud into the path of the driver to enable the latter on the succeeding forward stroke, to rock the detainer onto the cam shoulder to shift the set member and render the drive means effective.

75. In a listing machine, the combination with a shiftable paper carriage; means to feed the carriage in one direction; and means to drive the carriage in the opposite direction; of a plurality of adjustable devices to control the carriage drive means; means to automatically release one of said control devices at the conclusion of a single operation of the carriage drive mechanism; the other of said control devices adapted, when set to operative position, to automatically render the carriage drive means effective and ineffective alternately.

76. In a listing machine, the combination with a shiftable paper carriage; and means to drive the carriage in one direction; of an adjustable mechanism to control the carriage drive means, to render the latter effective and ineffective automatically on alternate operations of the machine.

77. In a listing machine, the combination with a shiftable paper carriage; means to feed the carriage in one direction; and means to drive the carriage in the opposite direction; of a plurality of adjustable devices to control the carriage drive means; means to automatically release one of said control devices at the conclusion of a single operation of the carriage drive mechanism; the other of said control devices adapted, when set to operative position, to automatically render the carriage drive means effective and ineffective alternately; and carriage-controlled means to release either or both adjustable control devices and render the carriage drive means inoperative.

78. In a calculating machine, the combination with a set of counters, and drive members therefor, adapted for engagement and disengagement; a shiftable paper carriage; means to feed the carriage in one direction; means to drive the carriage in the opposite direction; and a device to normally disable the carriage drive means, and adjustable to inactive position; of adjustable control mechanism, relatively to which the disabling device is independently operable, the control mechanism effective when set for operation, to shift the disabling device to inactive position and release it for restoration to active position, alternately and automatically.

79. In a calculating machine, the combination with a set of counters, and drive members therefor, adapted for engagement and disengagement; a shiftable paper carriage; line space mechanism therefor; means to feed the carriage in one direction; means to drive the carriage in the opposite direction; and a device to normally disable the carriage drive mechanism, and adjustable to inactive position; of adjustable control mechanism, effective when set for operation to shift the disabling device to inactive position and release it for restoration to active position alternately and automatically; and means controlled by the carriage drive means to render the line space mechanism effective or ineffective with the disabling means.

80. In a calculating machine, the combination with a set of counters, and drive members therefor, adapted for engagement and disengagement; means to advance the drive members; means to delay the engagement of the counters and drive members to afford time for the latter to advance; non-add mechanism to prevent the engagement of the counters and drive members; and a main drive shaft; of means to mechanically operate the non-add mechanism during the time in which the drive members advance, and to retain the non-add mechanism effective during the return of the drive members to normal position, including a cam; a lever rocked by the shaft and having a loose connection with the cam to permit idle travel of the lever in one direction relatively to the cam; and means to restore the non-add mechanism to inoperative position.

81. In a calculating machine, the combination with a set of counters, and drive members therefor, adapted for engagement and disengagement; non-add mechanism to prevent the engagement of the counters and drive members; a shiftable paper carriage; means to feed the carriage in one direction; means to drive the carriage in the opposite direction; and a device which normally disables the carriage drive means, and adjustable to inactive position; of adjustable control mechanism, relatively to which the disabling device is independently operable, the control mechanism effective to shift the disabling device to inactive position and release it for restoration to active position, alternately and automatically; and a member operated directly by the carriage drive means to actuate the non-add mechanism.

82. In a calculating machine, the combination, with a set of counters, and drive members therefor, adapted for engagement and disengagement; means to advance the drive members; means to delay the engagement of the counters and drive members during such advance; normally idle non-add mechanism to prevent the engagement of the counters and drive members; and a main drive shaft; of means to mechanically operate the non-add mechanism during the advance of the drive members, including a cam; a lever having a loose connection with the cam to permit idle travel of the lever relatively to the cam throughout a portion of the stroke of the lever in one direction; a linkage including a displaceable coupling, between the lever and main drive shaft; and set mechanism to control the coupling.

83. In a calculating machine, the combination with a set of counters, and drive members therefor, adapted for engagement and disengagement; means to advance the drive members; means to delay the engagement of the counters and drive members during such advance; normally idle non-add mechanism to prevent the engagement of the counters and drive members; and a main drive shaft; of means to mechanically operate the non-add mechanism during the advance of the drive members, including a cam having ears spaced apart from each other; a lever normally lying adjacent one of the ears to shift the cam, to adjust the non-add mechanism for operation; a linkage, including a displaceable coupling, between the lever and main drive shaft, to rock the lever; set mechanism to control the coupling; and means to restore the non-add mechanism to idle position.

84. In a calculating machine, the combination with a set of counters, and drive members therefor, adapted for engagement and disengagement; means to advance the drive members; means to delay the engagement of the counters and drive members during such advance; normally idle non-add mechanism to prevent the engagement of the counters and drive members; and a main drive shaft; of means to mechanically operate the non-add mechanism during the advance of the drive members, including a cam having a recess formed therein; a lever having a loose connection with the cam to permit idle travel of the lever relatively to the cam during a portion of the stroke of the lever in one direction; a linkage, including a displaceable coupling, between the lever and main drive shaft, to rock the lever; set mechanism to control the displaceable coupling; a locking member on the non-add mechanism engaged by the cam to shift the non-add mechanism to effective position, and adapted to seat in the recess in the cam to hold the non-add mechanism effective; and means to restore the non-add mechanism to idle position when the cam is tripped at the end of the idle travel of the lever relatively thereto, to release the cam and locking member.

85. In a calculating machine, the combination with a set of counters, and drive members therefor, adapted for engagement and disengagement, means to advance the drive members; means to delay the engagement of the counters and drive members during such advance; normally idle non-add mechanism to prevent the engagement of the counters and drive members; and a main drive shaft; of means to mechanically operate the non-add mechanism during the advance of the drive members, including a cam; a lever having a loose connection with the cam to permit idle travel of the lever relatively to the cam throughout a portion of the stroke of the lever in one direction; a linkage, including a displaceable coupling, between the lever and main drive shaft; and means to automatically effect the displacement of the coupling on alternate operations of the machine, to render the non-add mechanism effective during such operations.

86. In a calculating machine, the combination with a set of counters, and drive members therefor, adapted for engagement and disengagement; a shiftable paper carriage; line space mechanism therefor; means to feed the carriage in one direction; means to drive the carriage in the opposite direction; and a device which normally disables the carriage drive means, and adjustable to inactive position; of adjustable control mechanism, relatively to which the disabling device is independently operable, the control mechanism effective to shift the disabling device to inactive position and release it for restoration to active position, alternately and automatically; line space disabling mechanism; means tending to render the line space disabling mechanism effective; and a member directly controlled by the carriage drive means to retain the line space disabling means idle when the carriage drive means is idle.

87. In a calculating machine, the combination with a set of counters, and drive members therefor, adapted for engagement and disengagement; a special key to control the time of engagement of the counters and drive members; a shiftable paper carriage; line space mechanism therefor; means to feed the carriage in one direction; means to drive the carriage in the opposite direction; and a device which normally disables the carriage drive means, and adjustable to inactive position; of adjustable control mechanism, relatively to which the disabling device is independently operable, the control mechanism effective to shift the disabling device to inactive position and release if for restoration to active position, alternately and automatically; and means operated by the special key to trip the disabling device and the control mechanism, to render ineffective the carriage drive means.

88. In a calculating machine, the combination with a set of counters and drive members adapted for engagement and disengagement; a key to control the time of engagement of the counters and drive members; a shiftable paper carriage; means to feed the carriage in one direction; means to drive the carriage in the opposite direction; and an adjustable device to normally disable the carriage drive means; of a normally idle control mechanism adapted to shift the adjustable device to ineffective position; the control mechanism including means to automatically effect the alternate shift of the adjustable device into and out of active position, the adjustable device operable independently of the control mechanism; trip mechanism for the adjustable device and the control mechanism; and independently operable means to actuate the trip mechanism to release the adjustable device for restoration to effective position, and the control mechanism for restoration to ineffective position.

89. In a calculating machine, the combination with a set of counters and drive members adapted for engagement and disengagement; a key to control the time of engagement of the counters and drive members; a shiftable paper carriage; means to feed the carriage in one direction; means to drive the carriage in the opposite direction; and an adjustable device to normally disable the carriage drive means; of a normally idle control mechanism adapted to shift the adjustable device to ineffective position; the control mechanism including means to automatically effect the alternate shift of the adjustable device into and out of active position, the adjustable device operable independently of the control mechanism.

90. In a listing machine, the combination with a printing mechanism; a paper carriage shiftable relatively thereto; means to feed the carriage in one direction; and a tabulating stop bar mounted on the carriage and equipped with tabulating stop lugs; of a shiftable escapement member, including a pair of abutment stops having a fixed relation to each other; one of the stops normally lying in the path of the tabulating stop lugs; the other member of the pair of stops spaced apart from the first named stop in the direction in which the carriage is fed, and normally lying out of the path of the tabulating stop lugs; means to releasably operate the escapement member, to withdraw the normally active stop to idle position, whereby to free the carriage to the action of its feed means, and to simultaneously interpose the normally inactive stop in the path of the tabulating stop lug previously in contact with the normally active stop, to arrest the carriage intermediate the ends of a column space; and means to restore the escapement member to normal position, whereby to return the normally inactive stop to idle position to release the first named tabulating stop lug and again free the carriage to the action of its feed means, and to introduce the normally active stop into the path of the succeeding tabulating stop lug to arrest the carriage at the end of its column spacing travel.

91. In a listing machine, the combination with a printing mechanism; a paper carriage shiftable relatively thereto; means to feed the carriage in one direction; and a series of tabulating stop lugs mounted on the carriage; of a rotatable escapement member, including an arresting stop normally in the path of the tabulating stop lugs; and an interrupting stop bearing a fixed relation to the arresting stop, and spaced apart therefrom in the direction in which the carriage is fed, the interrupting stop normally lying out of the path of the tabulating stop lugs; means to releasably operate the escapement member to withdraw the arresting stop to idle position, to thereby release the tabulating stop lug in contact therewith to the action of the carriage feed means and to simultaneously interpose the interrupting stop into the path of the tabulating stop lug to arrest the latter and the carriage, against unrestricted travel in one direction; and means to re-introduce the arresting stop into the path of the succeeding tabulating stop lug and to simultaneously withdraw the interrupting stop to idle position, to free the carriage to the action of its feed means, until said succeeding lug contacts the arresting stop.

92. In a listing machine, the combination with a printing mechanism; a paper carriage shiftable relatively thereto; means to feed the carriage in one direction; and a series of adjustable tabulating stop lugs mounted on the carriage; of an escapement with which the tabulating stop lugs individually coact, the escapement including a pair of stops spaced apart from, and bearing a fixed relation to, each other, one of the stops normally located in the path of the adjusted tabulating stop lugs to arrest the carriage; means to releasably operate the escapement to withdraw the arresting stop from the path of the tabulating stop lug in contact therewith to release the carriage to the action of its feed means, and to interpose the other stop of the pair in the path of the tabulating stop lug to interrupt the feed of the carriage; and restoring means to re-introduce the arresting stop into the path of the succeeding tabulating stop lug, and withdraw the interrupting stop to idle position, to permit the carriage to complete its feed to the next column.

93. In a listing machine, the combination with a printing mechanism; a paper carriage shiftable relatively thereto; means to feed the carriage in one direction; and a series of adjustable tabulating stop lugs mounted on the carriage; of a rotatable escapement member located adjacent the path of the tabulating stops; an arresting stop, and an interrupting stop mounted on the escapement member; the arresting and interrupting stops being spaced apart from and bearing a fixed relation to each other; a spring to normally hold the escapement member in one of its positions with the arresting stop in the path of the tabulating stop lugs, to afford an abutment against which the tabulating stop lugs successively impinge, and to maintain the interrupting stop out of the path of the tabulating stop lugs; a flexible pawl connected to the escapement member; a tappet adapted to wipe idly past the pawl in one direction, and to rotate the pawl and escapement member on its return, to withdraw the arresting stop from the path of the tabulating stop lug in contact therewith, to free the latter and the carriage to the action of the carriage feed means, and substantially at the same time, to interpose the interrupting stop into the path of the tabulating stop lug, to prevent the uncontrolled feed of the carriage; the tappet adapted to release the pawl near the end of its return stroke to enable the spring to restore the escapement member to normal position, and permit the carriage to complete its feed to the next column.

94. In a listing machine, the combination with a printing mechanism; a paper carriage shiftable relatively thereto; means to feed the carriage in one direction; and a series of adjustable tabulating stop lugs mounted on the carriage; of an escapement with which the tabulating stop lugs coact, including an adjustable member having a pair of divergent arms, one arm of which normally lies in the path of the tabulating stop lugs to arrest the carriage in various columnar positions relatively to the printing mechanism, and the other arm of which member normally lies outside the path of travel of the tabulating stop lugs; means to releasably shift the adjustable member, subsequently to the printing operation, to withdraw the arresting stop arm, and interpose the other arm into the path of the tabulating stop lug released by the arresting stop arm; and means to restore the arms to normal position upon the release of the adjustable member by the shifting means.

95. In a listing machine, the combination with a printing mechanism; a paper carriage shiftable relatively thereto; means to feed the carriage in column spacing direction; and line space mechanism; of a series of adjustable tabulating stop lugs mounted on the carriage; an arresting stop in the path of the stop lugs; a shiftable plate along which the stop lugs are adapted to wipe, as the carriage travels in column spacing direction; and means controlled by the shiftable plate to maintain the line space mechanism inoperative until the stop lugs release the plate.

96. In a listing machine, the combination with a printing mechanism; a paper carriage shiftable relatively thereto; means to feed the carriage in column spacing direction; and line space mechanism; of a shiftable plate to control the line space mechanism; means traveling with the carriage and in contact with the shiftable plate to maintain the latter in such position that it holds the line space mechanism inoperative.

97. In a listing machine, the combination with a printing mechanism; a paper carriage shiftable relatively thereto; means to feed the carriage in column spacing direction; and line space mechanism; of a line space disabling mechanism including a shiftable control plate; means to retain the control plate in one of its positions and the line space disabling mechanism normally idle; and means adjustable on the carriage and adapted to contact the control plate to shift the line space disabling mechanism to and hold it in effective position, during the travel of such means along the plate.

98. In a listing machine, the combination with a printing mechanism; a paper carriage shiftable relatively thereto; means to feed the carriage; and line space mechanism; of a shiftable plate; an arm controlled by the plate; a line space disabling member controlled by the arm and shiftable into and out of effective position; and a device mounted on the carriage and adapted to contact and ride along the plate, to maintain the line space disabling member effective, the path of the said device extending beyond the plate, to enable the release of the plate and permit the line space disabling member to return to idle position.

99. In a listing machine, the combination with a printing mechanism; a paper carriage shiftable relatively thereto; means to feed the carriage; and line space mechanism; of a line space disabling member shiftable into and out of effective position; a shiftable plate to control the disabling member; and a device adjustable relatively to the plate; and adapted to wipe therealong as the carriage is fed, to maintain the disabling member effective during the printing of characters in one or more columns.

100. In a listing machine, the combination with a printing mechanism; a paper carriage shiftable relatively thereto; means to feed the carriage in one direction; column tabulating mechanism, including adjustable tabulating stop lugs, and an escapement, to control the feed of the carriage; and line space mechanism; of means to drive the carriage in the opposite direction; and a line space disabling member common to the column tabulating mechanism, and to the carriage drive mechanism, and operable by each, to maintain the line space mechanism inoperative.

101. In a listing machine, the combination with a printing mechanism; a paper carriage shiftable relatively thereto; means to feed the carriage in one direction; column tabulating mechanism, including adjustable tabulating stop lugs, and an escapement, to control the feed of the carriage; and line space mechanism; of means to drive the carriage in the opposite direction; a line space disabling member common to the column tabulating mechanism and to the carriage drive mechanism; means to shift the line space disabling member to effective position; carriage drive-controlled mechanism to hold the line space disabling member ineffective; and separate and superior means controlled by the column tabulating mechanism, to hold the line space disabling member effective.

102. In a listing machine, the combination with a printing mechanism; a paper carriage shiftable relatively thereto; and line space mechanism; of combined automatic shuttling and automatic column tabulating mechanisms for said carriage, including means common to the shuttling and tabulating mechanisms to feed the carriage in one direction; tabulating stop lugs, and an escapement with which the lugs coact, to control the tabulating feed of the carriage; means to drive the carriage in opposition to the direction in which the carriage travels under the influence of the carriage feed means; means to connect the carriage with its drive means; and means to control the tabulating stop lugs and the connecting means to disable either and enable the other to operate.

103. In a listing machine, the combination with a printing mechanism; a paper carriage shiftable relatively thereto; and line space mechanism; of combined automatic shuttling and automatic column tabulating mechanisms for said carriage, including means common to the shuttling and tabulating mechanisms to feed the carriage in one direction; tabulating stop lugs, and an escapement with which the lugs coact, to control the tabulating feed of the carriage; means to drive the carriage in opposition to the direction in which the carriage travels under the influence of the carriage feed means; means to connect the carriage with its drive means; means to control the tabulating stop lugs and the connecting means to disable either and enable the other to operate; a line space disabling member common to the shuttling and tabulating mechanisms; means controlled by the carriage drive means to normally retain the line space disabling member ineffective; and means controlled by the tabulating mechanism to retain the line space disabling member effective.

104. In a listing machine, the combination with a printing mechanism; a paper carriage shiftable relatively thereto; and line space mechanism; of combined automatic shuttling and automatic column tabulating mechanisms for said carriage, including means common to the shuttling and tabulating mechanisms to feed the carriage in one direction; tabulating stop lugs, and an escapement with which the lugs coact to control the tabulating feed of the carriage; means to drive the carriage in opposition to the direction in which the carriage travels under the influence of the carriage feed means; means to connect the carriage with its drive means; means to control the tabulating stop lugs and the connecting means to disable either and enable the other to operate; a line space disabling member common to the shuttling and tabulating mechanisms; means, including a flexible link, controlled by the carriage drive means to normally retain the line space disabling member ineffective; and means controlled by the tabulating mechanism to overcome the flexible link and retain the line space disabling member effective.

105. In a listing machine, the combination with a printing mechanism; a paper carriage shiftable relatively thereto; means to feed the carriage in one direction; column tabulating mechanism, including adjustable tabulating stop lugs, and an escapement, to control the feed of the carriage; and line space mechanism; of means to drive the carriage in the opposite direction; a line space disabling member adapted to shift into and out of the path of the line space mechanism to prevent or permit operation of the latter; and a plurality of means controlled by the column tabulating mechanism, and by the carriage drive mechanism, respectively; one of which means normally holds the line space disabling member ineffective, and the other of which holds the line space disabling member effective against the tendency of the first named means to hold it ineffective.

106. In a listing machine, the combination with a printing mechanism; a paper carriage shiftable relatively thereto; means to feed the carriage in one direction; column tabulating mechanism, including adjustable tabulating stop lugs, and an escapement, to control the feed of the carriage; and line space mechanism; of means to drive the carriage in the opposite direction; a line space disabling member adapted to shift into and out of the path of the line space mechanism to prevent or permit operation of the latter; and a plurality of means controlled by the column tabulating mechanism, and by the carriage drive mechanism, respectively; to hold the line space disabling member in its effective or ineffective position, depending upon whether the column tabulating, or the carriage drive means is operative.

107. In a listing machine, the combination with a printing mechanism; a paper carriage shiftable relatively thereto; means to feed the carriage in one direction; column tabulating mechanism, including a series of column stops, and an escapement, to control the columnar feed of the carriage; mechanism to drive the carriage in the opposite direction; and a line space mechanism; of an adjustable line space disabling member to prevent the operation of the line space mechanism; means to shift the line space disabling member to effective position; means controlled by the carriage drive mechanism to normally hold the disabling member ineffective against the influence of the means to shift the member to effective position; means to shift the column tabulating mechanism to effective or ineffective position; and means operable by the column tabulating means, when effective, to hold the line space disabling member in effective position against the influence of the carriage drive-controlled means.

108. In a listing machine, the combination with a printing mechanism; a paper carriage shiftable relatively thereto; means to feed the carriage in one direction; column tabulating mechanism, including a series of column stops, and an escapement, to control the columnar feed of the carriage; mechanism to drive the carriage in the opposite direction; and a line space mechanism; of an adjustable line space disabling member to prevent the operation of the line space mechanism, including a shaft; a slotted checking arm journaled thereon, and shiftable into and out of the path of the line space mechanism; an operating arm fast on the shaft; a shiftable plate; an arm fast with the plate and carrying a stud entered in the slot in the checking arm; a connecting spring between the last named arm and the operating arm; a spring to force the operating arm against the stud, to shift the checking arm to effective position; means controlled by the carriage drive mechanism and acting upon the operating arm and the connecting spring, to normally hold the checking arm ineffective; and means controlled by the column tabulating mechanism, and operable upon the shiftable plate to hold the checking arm effective against the influence of the carriage drive-controlled means.

109. In a listing machine, the combination with a printing mechanism; a paper carriage shiftable relatively thereto; means to feed the carriage in one direction; column tabulating mechanism, including a series of column stops, and an escapement, to control the columnar feed of the carriage; mechanism to drive the carriage in the opposite direction; and a line space mechanism; of an adjustable line space disabling member to prevent the operation of the line space mechanism; a shiftable plate; an arm carried thereby and having a loose connection with the line space disabling member; a spring-driven operating arm to shift the disabling member to effective position; a flexible connection between the operating arm and the arm carried by the plate; restraining means controlled by the carriage drive means to retract the operating arm and flexible connection, to hold the disabling member idle; the column tabulating mechanism adapted to contact the plate and shift the line space disabling member to effective position irrespective of the restraining means.

110. In a listing machine, the combination with a printing mechanism; a paper carriage shiftable relatively thereto; means to feed the carriage in one direction; column tabulating mechanism, including a series of column stops and an escapement, to control the columnar feed of the carriage; mechanism to drive the carriage in the opposite direction; and a line space mechanism; of an adjustable line space disabling member to prevent the operation of the line space mechanism; independently actuated arms to operate the line space disabling member; one of the arms having a loose connection with the line space disabling member; a yielding connection between the arms; means operable upon one of the arms to shift the line space disabling member to effective position; carriage drive-controlled means to normally hold the line space disabling member in idle position; and means connected to another of the arms, and controlled by the tabulating mechanism to hold the line space disabling member effective, irrespective of the carriage drive-controlled means operable upon the other arm.

111. In a listing machine, the combination with a printing mechanism; a paper carriage shiftable relatively thereto; line space mechanism; means to feed the carriage in one direction; means to drive the carriage in the opposite direction; tabulating stop lugs on the carriage; and an escapement with which the lugs coact; of a line space disabling member; means tending to shift the line space disabling member to effective position; restraining mechanism, including a flexible connection releasably operated by the carriage drive means to hold the disabling member in idle position; and mechanism controlled by the tabulating stop lugs to overcome the restraining mechanism, and hold the line space disabling member effective during the printing in one or more columns.

112. In a listing machine, the combination with a printing mechanism; a paper carriage shiftable relatively thereto; means to feed the carriage in letter spacing direction; and line space mechanism; of a line space disabling member; a shiftable plate connected therewith; and means on the carriage to wipe along the plate and hold it in one of its positions to maintain the line space disabling member operative.

113. In a listing machine, the combination with a printing mechanism; a paper carriage shiftable relatively thereto; means to feed the carriage in letter spacing direction; and line space mechanism; of a line space disabling member; a shiftable plate connected therewith; a spring normally tending to move the line space disabling member to operative position; means to releasably overcome the spring and hold the line space disabling member inoperative; and a device mounted on the carriage to travel therewith and adapted to wipe along the plate to hold the line space disabling member in its operative position irrespective of the means to releasably maintain the member inoperative.

114. In a listing machine, the combination with a printing mechanism; a paper carriage shiftable relatively thereto; means to feed the carriage in letter spacing direction; and line space mechanism; of a line space disabling member; a shiftable plate connected therewith; a spring-pressed arm to hold the disabling member in its operative position; releasable means to maintain the disabling member inoperative; a yielding connection between the arm and the plate; and a shiftable device mounted on the carriage to travel therewith and adapted to releasably contact the plate to hold the disabling member in its operative position, irrespective of the means to maintain the member inoperative.

115. In a listing machine, the combination with a printing mechanism; and a paper carriage shiftable relatively thereto; means to feed the carriage in letter spacing direction; and a column stop tabulating mechanism, including an escapement; of means to drive the carriage in the opposite direction against the influence of the carriage feeding means, including a shiftable abutment; a second tabulating mechanism mounted on the carriage, manually adjustable to connect the latter to the abutment; and means to disable either of the tabulating mechanisms and render the other effective.

116. In a listing machine, the combination with a printing mechanism; and a paper carriage shiftable relatively thereto; means to feed the carriage in letter spacing direction; and a column stop tabulating mechanism, including an escapement; of means to drive the carriage in the opposite direction against the influence of the carriage feeding means, including a shiftable abutment; and a second tabulating mechanism mounted on the carriage and manually adjustable to connect the latter to the abutment; means to retain one of the tabulating mechanisms effective; and the other ineffective, and means common to both tabulating mechanisms to shift either to effective position and the other to ineffective position.

117. In a listing machine, the combination with a printing mechanism; a paper carriage shiftable relatively thereto; means to feed the carriage in letter spacing direction; and a column stop tabulating mechanism; including an escapement; of means to drive the carriage in the opposite direction against the influence of the carriage feeding means, including a shiftable abutment; and a second tabulating mechanism mounted on the carriage and manually adjustable to connect the latter to the abutment; springs to retain one of the tabulating mechanisms effective, and the other ineffective; and a single manually-controlled member to reverse the operative and inoperative positions of both of the tabulating mechanisms at will.

118. In a listing machine, the combination with a printing mechanism; a paper carriage shiftable relatively thereto; means to feed the carriage in letter spacing direction; a column tabulating mechanism, including a series of tabulating stops, and an escapement, to control the feed of the carriage in letter spacing direction; and means to render the column tabulating mechanism effective or ineffective; of means to drive the carriage in the opposite direction, including a traveling abutment; and a stop mounted on the carriage and engageable with the abutment; means to automatically effect the operation of the carriage drive means on alternate operations of the machine, to shuttle the carriage; and means to render the automatic shuttling mechanism effective or ineffective.

119. In a listing machine, the combination with a printing mechanism; a paper carriage shiftable relatively thereto; means to feed the carriage in letter spacing direction; and column tabulating mechanism, including a series of tabulating stops and an escapement, to control the feed of the carriage in letter spacing direction; and means to render the column tabulating mechanism effective or ineffective; of means to drive the carriage in the opposite direction, including a traveling abutment; and a stop mounted on the carriage and engageable with the abutment; manually set means to effect single operations of the carriage drive means at will; and manually set means to control the first named set means, to automatically effect the operation of the carriage drive means on alternate operations of the machine, and thus shuttle the carriage.

120. In a listing machine, the combination with a printing mechanism; a paper carriage shiftable relatively thereto; means to feed the carriage in letter spacing direction; and column tabulating mechanism, including a series of tabulating stops and an escapement, to control the feed of the carriage in letter spacing direction; of means to drive the carriage in the opposite direction, including a traveling abutment; and a stop mounted on the carriage and engageable with the abutment; means to automatically effect the operation of the carriage drive means on alternate operations of the machine, to shuttle the carriage; and manually-controlled means to disable the carriage drive means and render the tabulating means effective, and vice versa.

121. In a calculating machine, the combination with a printing mechanism; a paper carriage shiftable relatively thereto; and feed means for the carriage; of a column tabulating mechanism therefor, including a stationary rack, a column tabulating shaft journaled in the carriage, column tabulating stops slidably and rotatably mounted on the rod, the stops provided with teeth adapted to mesh with the rack; and an escapement with which the stops coact; the stops adapted to occupy positions in and out of alinement with the escapement while still in mesh with the rack which retains the stops where adjusted on the shaft.

MAX SCHUPPE.

Witnesses:
  THEO. C. WIELY,
  ARTHUR PENTECOST.